United States Patent
Kim et al.

(10) Patent No.: US 11,017,263 B2
(45) Date of Patent: May 25, 2021

(54) APPARATUS AND METHOD FOR RECOGNIZING OBJECT IN IMAGE

(71) Applicant: Samsung Electronics Co., Ltd., Gyeonggi-do (KR)

(72) Inventors: Sangheon Kim, Gyeonggi-do (KR); Inhyung Jung, Gyeonggi-do (KR); Jongwu Baek, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 65 days.

(21) Appl. No.: 16/366,660

(22) Filed: Mar. 27, 2019

(65) Prior Publication Data

US 2019/0303708 A1 Oct. 3, 2019

(30) Foreign Application Priority Data

Apr. 3, 2018 (KR) .......................... 10-2018-0038752

(51) Int. Cl.
*G06K 9/60* (2006.01)
(52) U.S. Cl.
CPC ...................................... *G06K 9/60* (2013.01)
(58) Field of Classification Search
CPC ........................................................ G06K 9/60
See application file for complete search history.

(56) References Cited

U.S. PATENT DOCUMENTS

| | | | |
|---|---|---|---|
| 8,861,864 B2 | 10/2014 | Hong et al. | |
| 2015/0006670 A1 | 1/2015 | Park et al. | |

(Continued)

FOREIGN PATENT DOCUMENTS

| | | |
|---|---|---|
| CN | 107690649 | 2/2018 |
| JP | 2012-109732 | 6/2012 |

(Continued)

OTHER PUBLICATIONS

International Search Report dated Jul. 5, 2019 issued in counterpart application No. PCT/KR2019/003548, 7 pages.

(Continued)

*Primary Examiner* — Oneal R Mistry
(74) *Attorney, Agent, or Firm* — The Farrell Law Firm, P.C.

(57) ABSTRACT

An electronic device is provided and includes a housing having a first external surface; a first imaging device exposed through a first portion of the first external surface and comprising a first field of view (FOV); a second imaging device exposed through a second portion adjacent to the first portion and comprising a second FOV narrower than the first FOV; a communication circuit; at least one processor operatively connected to the first imaging device, the second imaging device, and the communication circuit; and a memory operatively connected to the processor and configured to store instructions executed through the processor that cause the processor to generate a first image including a first object and a second object from a first time point through the first imaging device, generate a second image including the first object simultaneously with the generation of the first image from the first time point through the second imaging device, transmit the first image and the second image to an external server through the communication circuit, receive object recognition information of the first object and the second object, detect motion of the electronic device, generate a third image including the second object from a second time point different from the first time point through the second imaging device, extract an object image from the third image, based at least partially on the information or the detected motion, the object image being smaller than the third image, and transmit the object image and the object (Continued)

recognition information to the external server through the communication circuit.

20 Claims, 18 Drawing Sheets

(56) References Cited

U.S. PATENT DOCUMENTS

| | | |
|---|---|---|
| 2015/0339861 A1 | 11/2015 | Yun et al. |
| 2016/0381282 A1* | 12/2016 | Bandlamudi ...... H04N 5/23296 348/240.3 |
| 2016/0381289 A1 | 12/2016 | Kim et al. |
| 2017/0103256 A1* | 4/2017 | Velozo ............... G06K 9/00228 |
| 2017/0109609 A1* | 4/2017 | Hill ...................... G06K 9/6215 |
| 2018/0070010 A1 | 3/2018 | Wang et al. |
| 2019/0020823 A1* | 1/2019 | Jeon ................... H04N 5/23216 |
| 2019/0259284 A1* | 8/2019 | Khadloya ................. G06T 7/97 |

FOREIGN PATENT DOCUMENTS

| | | |
|---|---|---|
| JP | 2014-154062 | 8/2014 |
| KR | 1020150001329 | 1/2015 |
| KR | 1020150135895 | 12/2015 |
| KR | 101731568 | 5/2017 |

OTHER PUBLICATIONS

European Search Report dated Feb. 17, 2021 issued in counterpart application No. 19782109.3-1207, 8 pages.

* cited by examiner

APPARATUS AND METHOD FOR RECOGNIZING OBJECT IN IMAGE

CROSS-REFERENCE TO RELATED APPLICATION(S)

This application is based on and claims priority under 35 U.S.C. § 119 to Korean Patent Application No. 10-2018-0038752, filed on Apr. 3, 2018, in the Korean Intellectual Property Office, the disclosure of which is incorporated herein by reference in its entirety.

BACKGROUND

1.) Field

The disclosure relates generally to an apparatus and a method for recognizing an object in an image.

2.) Description of Related Art

Due to the recent development in technology, demand for various types of images have increased. In order to provide such images, an electronic device including a plurality of image sensors has been supplied.

The electronic device may provide an object recognition service using a camera to improve user convenience. For example, the electronic device may recognize an object on the basis of a preview image acquired through a camera and provide a search service related to the recognized object.

An electronic device may include a camera module including a first camera which corresponds to a wide field of view (FOV) and provides a preview image with low magnification and a second camera which corresponds to a narrow FOV and provides a preview image with high magnification. When a user enlarges a preview image, the electronic device may switch the first camera to the second camera and provide an enlarged preview image. Accordingly, when the electronic device performs a tracking operation based on the enlarged preview, the electronic device becomes sensitive to a change in motion of the electronic device or an object and thus load corresponding to a shorter period on which a tracking engine is called is generated, such that a method of improving load of the electronic device is necessary.

In order to reduce the load of the electronic device and the consumption of data exchanged with a server for object recognition, it would be advantageous to provide an electronic device and a method for performing object recognition acquired through the second camera on the basis of information on an object recognized through the first camera.

SUMMARY

The present disclosure has been made to address the above-mentioned problems and disadvantages, and to provide at least the advantages described below. In accordance with an aspect of the disclosure, an electronic device is provided that includes a housing comprising a first external surface; a first imaging device exposed through a first portion of the first external surface and comprising a first FOV; a second imaging device exposed through a second portion adjacent to the first portion and comprising a second FOV narrower than the first FOV; a communication circuit; at least one processor operatively connected to the first imaging device, the second imaging device, and the communication circuit; and a memory operatively connected to the processor and configured to store instructions executed through the processor that cause the processor to generate a first image including a first object and a second object from a first time point through the first imaging device, generate a second image including the first object simultaneously with the generation of the first image from the first time point through the second imaging device, transmit the first image and the second image to an external server through the communication circuit, receive object recognition information of the first object and the second object, detect motion of the electronic device, generate a third image including the second object from a second time point different from the first time point through the second imaging device, extract an object image from the third image, based at least partially on the information or the detected motion, the object image being smaller than the third image, and transmit the object image and the object recognition information to the external server through the communication circuit.

In accordance with another aspect of the disclosure, a method of operating an electronic device is provided. The method includes generating a first image including a first object and a second object through a first imaging device at a first time point; generating a second image including the first object simultaneously with the generation of the first image through a second imaging device at the first time point; transmitting the first image and the second image to an external server; receiving object recognition information of the first object and the second object from the external server; detecting motion of the electronic device; generating a third image including the second object through the second imaging device at a second time point different from the first time point; extracting an object image from the third image, based at least partially on the information and the detected motion, the object image being smaller than the third image; and transmitting the object image and the object recognition information to the external server. The first imaging device may include a first FOV and the second imaging device may include a second FOV narrower than the first FOV.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
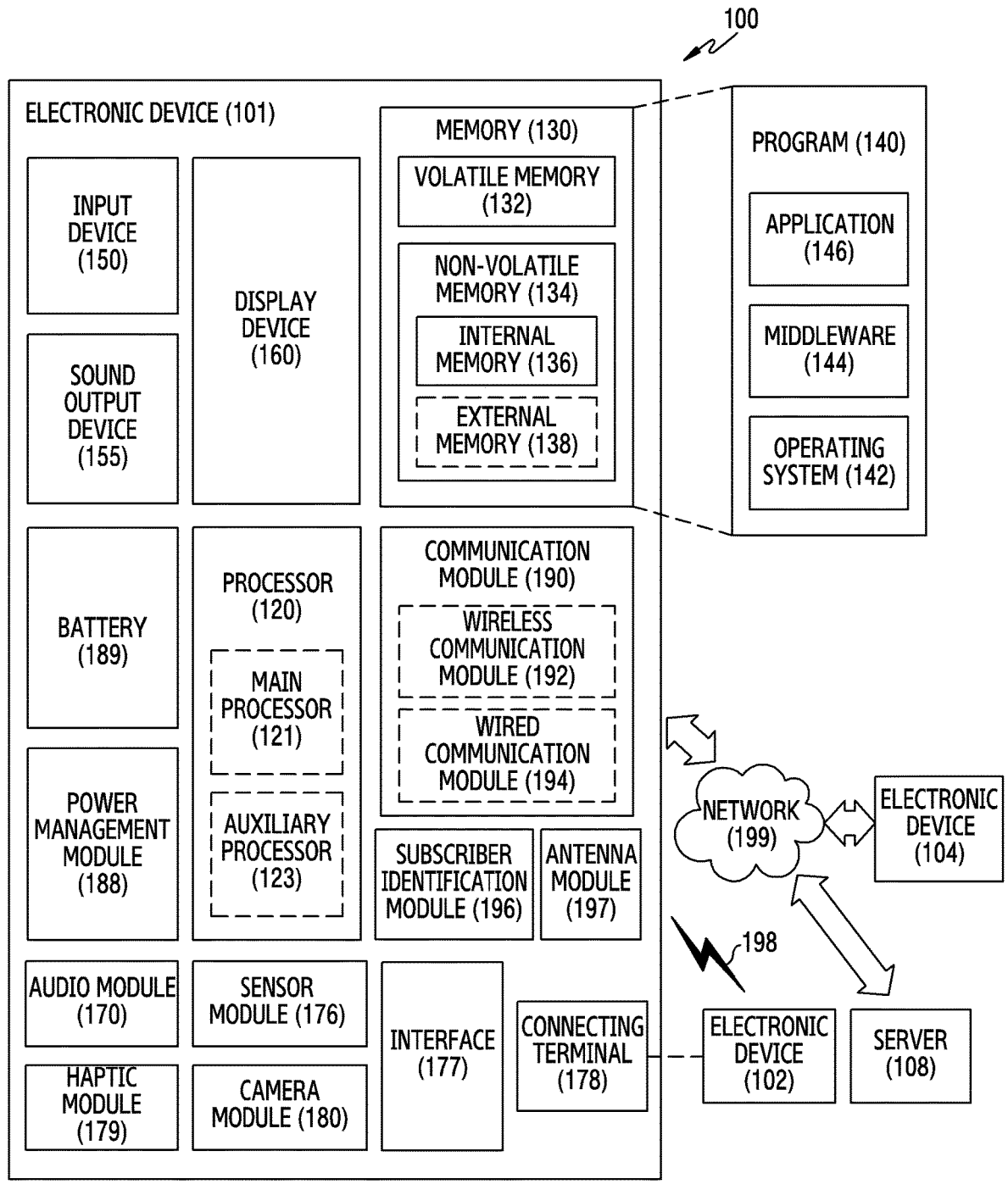
FIG. 1 is a block diagram illustrating an electronic device within a network environment, according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing a record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or Infrared Data Association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of the operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
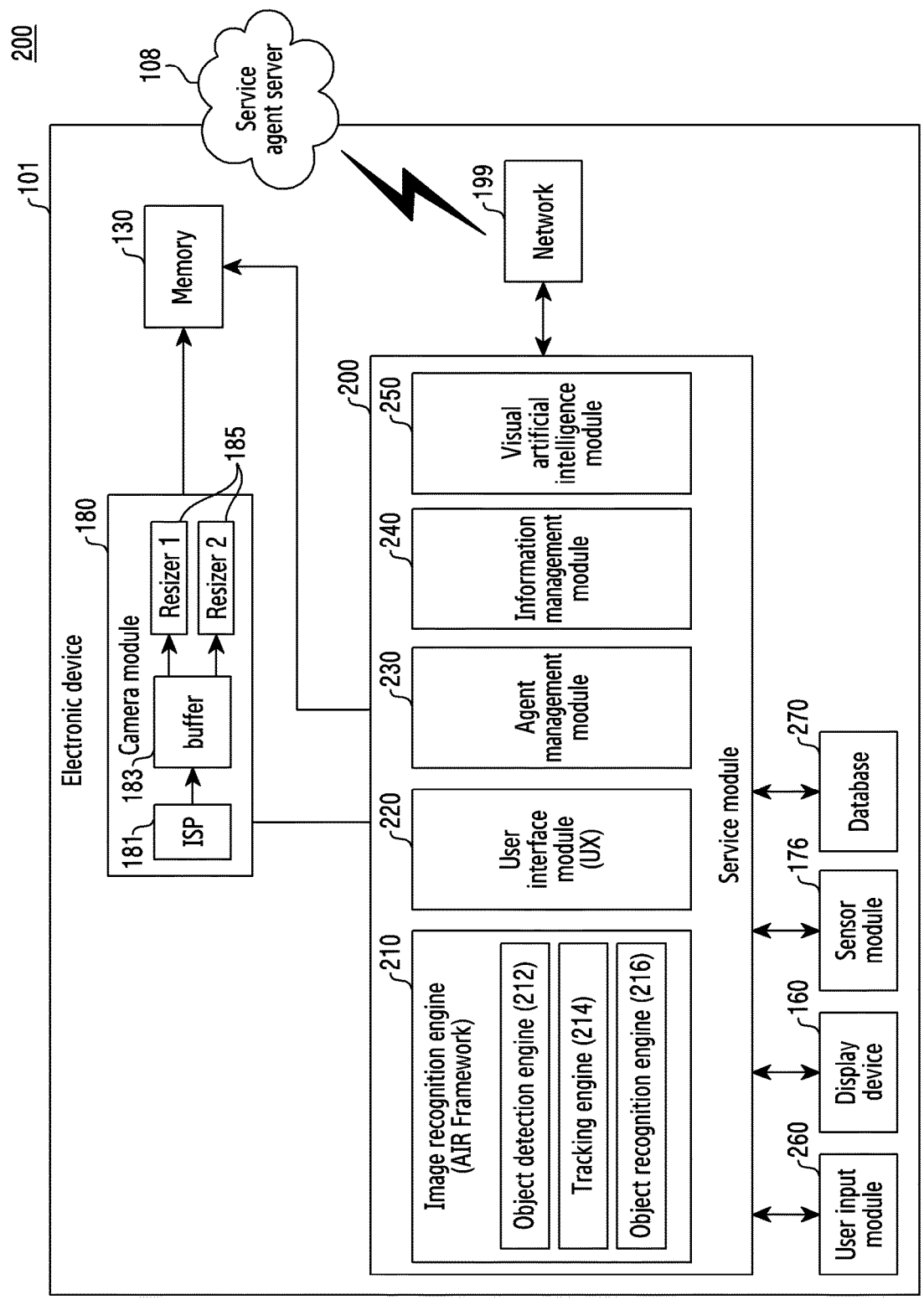
FIG. 2 is a functional block diagram illustrating an electronic device, according to an embodiment.

FIG. 2 is a functional block diagram illustrating an electronic device, according to an embodiment. The functional configuration of the electronic device may be included in the electronic device 101 of FIG. 1.

Referring to FIG. 2, the electronic device 101 includes a camera module 180, a service module 200, a user input module 260, a display device 160, a memory 130, a sensor module 176, and a database 270.

The display device 160 may output data or signals in the form of an image or a video. The display device 160 may receive data or signals from an ISP 181 of the camera module 180 and display a preview image. The preview image is a real-time image received through a camera lens of the camera module 180 and may include an image provided to acquire a still image of the user.

The memory 130 may store an instruction, a control instruction code, control data, or user data for controlling the electronic device 101. For example, the memory 130 may include an application 146, an OS 142, middleware 144, and a device driver. The memory 130 may store information for object recognition. For example, the memory 130 may include type information to classify a plurality of objects and information on a key point of each of a plurality of types included in the type information. The type information may be information generated on the basis of a common feature of a plurality of objects which can be classified as a common type. The key point information may be information acquired through image processing. For example, objects corresponding to each type may correspond to a shape including a common feature corner point. The memory 130 may store information on the feature shape of each type as key point information. The memory 130 may store recognition information of an object acquired through an image. For example, the memory 130 may include information on the recognition result of a plurality of objects included in an image acquired through a camera corresponding to a wide FOV. Information on the recognition result may include information on an object type and a location of the object within the image acquired through the camera corresponding to the wide FOV. The information on the recognition result may be information on which a preview image is provided to an external device (for example, the server 108) by the electronic device 101 and processed and received by the external device. Further, the information on the recognition result may be information processed by an image recognition engine 210 (advanced image recognition (AIR) framework) included in the service module 200 of the electronic device 101.

The camera module 180 may perform image processing for displaying videos or images received from a plurality of images sensors on a screen in real time and perform a task for compressing an image to be stored in the memory 130. The camera module 180 may further include a plurality of image sensors, the ISP 181, a buffer 183, and a resizer 185. For example, the camera module 180 may include a plurality of image sensors having different angles of view and may perform a task of compressing screen images corresponding to videos or images received from the plurality of image sensors and displayed on the screen in real time, and corresponding to images to be stored in the memory. The screen-displayed image may vary depending on the display standard of the electronic device 101. For example, with respect to an image to be displayed on a full high definition (FHD) screen, a preview image may be generated with an FHD resolution. In another example, an image may be stored with a higher resolution determined according to pixels of the camera, and different resolutions may be stored according to user definitions. For example, the user may store images having resolutions corresponding to capacities of 5 MB and 3 MB. Further, the camera module 180 may determine and generate information on an image to be displayed using a plurality of videos or images received from a plurality of sensors. The camera module 180 may include a plurality of ISPs 181 and resizers 185 in order to simultaneously process images received through a plurality of image sensors. Through the plurality of ISPs 181 and the plurality of resizers 185, the camera module 180 may simultaneously process an image corresponding to a wide FOV and an image corresponding to a narrow FOV. The camera module 180 may be referred to as an imaging device or an image device.

The service module 200 may further include an image recognition engine 210, a user interface module 220, an agent management module 230, an information management module 240, and a visual artificial intelligence module 250. The image recognition engine 210 (AIR framework) may include an object detection engine 212, a tracking engine 214, and an object recognition engine 216. The image recognition engine 210 may analyze an image received from the memory 130 or the camera module 180. The analysis result may calculate information for guiding a user input in part of the output to the display device 160 or may be required to be fed back by the user among the analysis result through the user input module 260. The image analysis may be performed by the electronic device 101, or the electronic device 101 may transmit information related to the image (image files, key points, analyzed content, keywords, or metadata) to the service agent server 108 through the network 199 and then receive analysis information performed by the service agent server 108.

The user interface module 220 may output the image analysis result in a camera application according to a user input received through the user input module 260 to the display device 160 or, when the analysis result requires user feedback, provide a user interface for receiving user input.

The agent management module 230 may determine the agent server 108 to which a query is transmitted according to the image analysis result or user input. For example, when a user interface indicating that an image is relevant to a code search and a product search through analysis of the image input into a camera preview is displayed on the screen, if the user selects the product search, the agent server 108 may transmit the image and information on a region of interest (ROI) in which the product is found to a product search site (for example, Amazon, Alibaba, and Taobao) through a query. If the image analysis requires a higher-resolution photo, a request for a high resolution image may be made to the camera module 180. The camera module 180 may transmit a high resolution image to the service module 200 on the basis of a user request time point, and the service module 200 may perform image analysis on the basis of the high resolution image. For example, the high resolution image may include a high resolution image at a time point at which user input is received, an image having the highest quality among images stored in a camera ring buffer, a pre-stored image, or an image newly photographed with a designated resolution based on a user request.

The information management module 240 may integrate information detected by the image recognition engine 210, parse the integrated information, and transmit the information to an application (for example, info camera app). The priority of the information transmitted to the application may be determined in an order of a region of interest of a priority engine, QR code information, barcode information, classifier information, and type of the recognized engine. For example, the region of interest of the priority engine may be determined on the basis of an order of QR code, barcode, landscape, object, and document. The application may be displayed through the display device 160 on the basis of information received from the information management module 240 and may use information required for communication with the server 108. The information management module 240 may include a motion tracker. A motion sensor may include a motion vector for detecting accuracy of motion of the electronic device 101 and may check stability of the electronic device 101 on the basis of the motion vector. When motion of the electronic device 101 is not large or when an amount of motion of the electronic device 101 is less than or equal to a threshold value, for example, when the stability is less than or equal to the threshold value, a motion value may be transmitted to allow the image recognition engine 210 of the service module 200 to detect an object. A motion tracker may calculate complexity of the detected object according to the size of feature information of the detected object.

The information management module 240 may further include a visual feature engine. The visual feature engine may show a feature effect for detecting an object on the basis of a degree of motion of the electronic device 101 measured by the information management module 240 and a complexity of an object which can be measured when the object is detected. Further, the visual feature engine may successively display an effect of tracking an object. The visual feature engine may display an effect on the basis of depth information of the object and a chrominance change or display a tracking effect on the basis of motion of the electronic device or motion of the object.

The information management module 240 may further include a recognition pre-processing module. The recognition pre-processing module may determine mapping information of a photographed area on the basis of a difference between angles of view of the first camera and the second camera, as well as a configuration including a focal distance. The pre-processing recognition module may map the location of a pre-recognized object on the basis of information on motion of the electronic device 101 received from the sensor module 176 and information on a first angle of view corresponding to the first camera and a second angle of view corresponding to the second camera and generate type information of the recognized object.

The database 270 may store information for providing a visual artificial intelligence service. For example, the database 270 may store information on predefined types of objects (for example, a cylindrical container, a tubular container, a person, a piano, and a puppy, etc.). Accordingly, the electronic device 101 may perform an image analysis process in the electronic device 101 without transmitting an image to the server 108 to analyze the image.

Further, the database 270 may store information on a pre-searched object. For example, the electronic device 101 may provide an object recognition service for drink A according to a request from the user and store the corresponding information in the database 270. Therefore, when an object which is the same as drink A is recognized, the electronic device 101 may transmit an image to the server 108 and display information on object recognition corresponding to drink A on the basis of pre-stored information without receiving the image analysis result from the server 108.

The visual artificial intelligence module 250 (vision intelligence agent) may categorize and store the analysis result of input images. For example, the visual artificial intelligence module 250 may categorize input images into person, furniture, clothes, and car, and then subdivide and store the images into particular furniture types (for example, chair, desk, stand, and lamp, etc.) and cloth types (for example, top, bottom, skirt, pants, T-shirt, and coat, etc.). The visual artificial intelligence module 250 may build a database with information of image data such as a time point at which an image is saved and a location at which an image is photographed as well as a color, atmosphere, and landscape of an image and use the input image for a search.

Figure 3A:
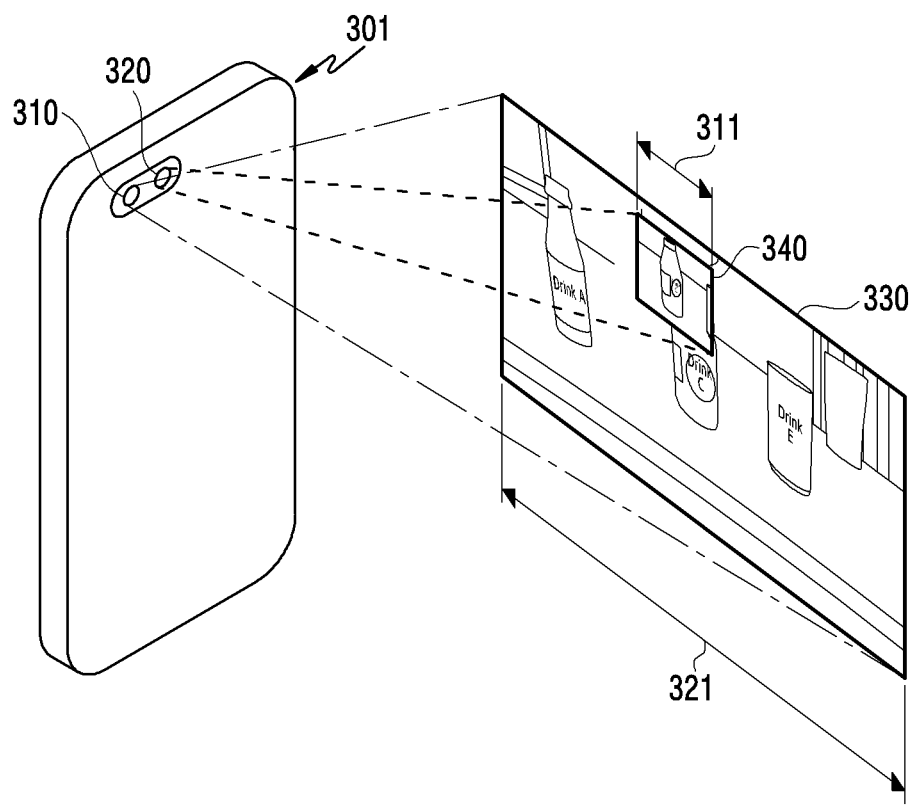
FIG. 3A illustrates an area of a preview image acquired by a first camera and a second camera of an electronic device, according to an embodiment.

FIG. 3A illustrates an area of a preview image acquired by a first camera and a second camera of an electronic device, according to an embodiment.

Referring to FIG. 3A, the electronic device 301 includes a first camera 310 and a second camera 320. The electronic device 301 may include a housing, and the first camera 310 and the second camera 320 may be located on one surface of the housing. For example, the first camera 310 and the second camera 320 may be located on one surface on the side including the display device 160 of the electronic device 301.

Further, the first camera 310 and the second camera 320 may be arranged in parallel at a predetermined interval to acquire depth information on the basis of perspective. The first camera 310 and the second camera 320 may correspond to different magnifications. For example, the first camera 310 may be a camera for acquiring a preview image of low magnification (for example, ×1 to ×2) and the second camera 320 may be a camera for acquiring a preview image of high magnification (for example, ×2 to ×4).

Figure 3B:
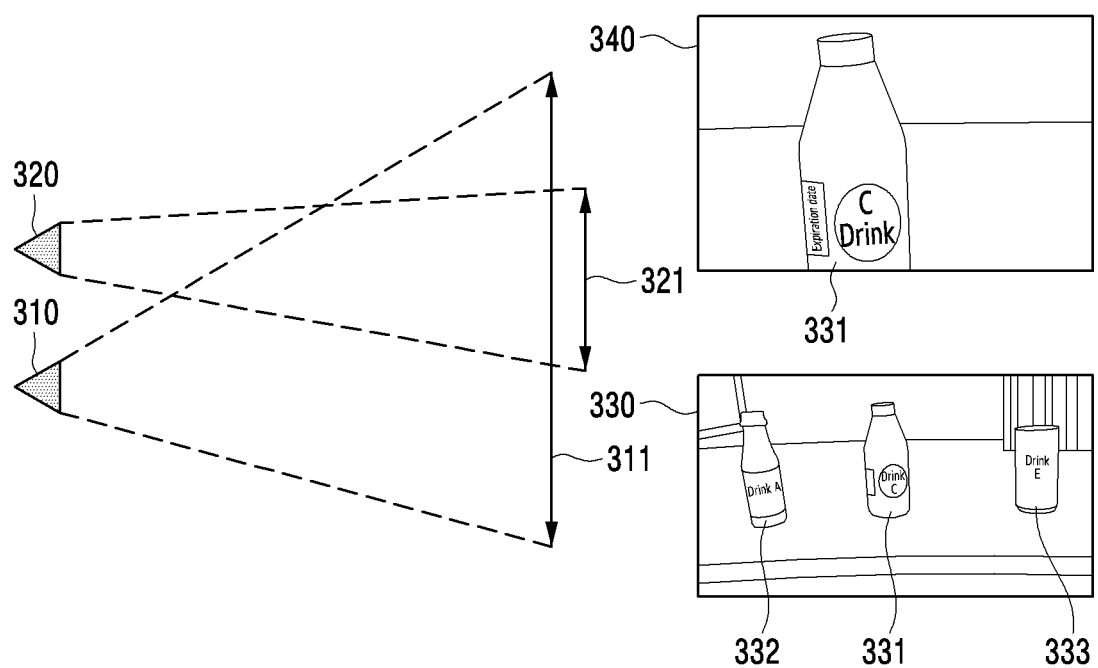
FIG. 3B illustrates a preview image acquired by each of a first camera and a second camera of an electronic device, according to an embodiment.

The first camera 310 may be a camera corresponding to a wide FOV. An image acquired by the first camera 310 may correspond to a first image 330. The first camera 310 corresponding to the wide FOV may be referred to as a wide angle camera, a wide camera, or a low magnification camera. The first image 330 acquired by the first camera 310 may be referred to as a wide image, a wide angle image, or a low magnification image. Referring to FIG. 3A, the first image 330 may be an image pertaining to the wide FOV corresponding to a width 311 of a first length. Referring to FIG. 3B, the first image 330 may include all of a first object 331 to a third object 333.

The second camera 320 may be a camera corresponding to a narrow FOV. An image acquired by the second camera 320 may correspond to a second image 340. The second camera 320 corresponding to the narrow FOV may be referred to as a high magnification camera. The second image 340 acquired by the second camera 320 may be referred to as a low magnification image. Referring to FIG. 3A, the second image 340 may be an image pertaining to the narrow FOV corresponding to a width 321 of a second length, and may include some of the first object 331 to the third object 333. For example, the second image 340 may include only the first object 331.

Figure 4A:
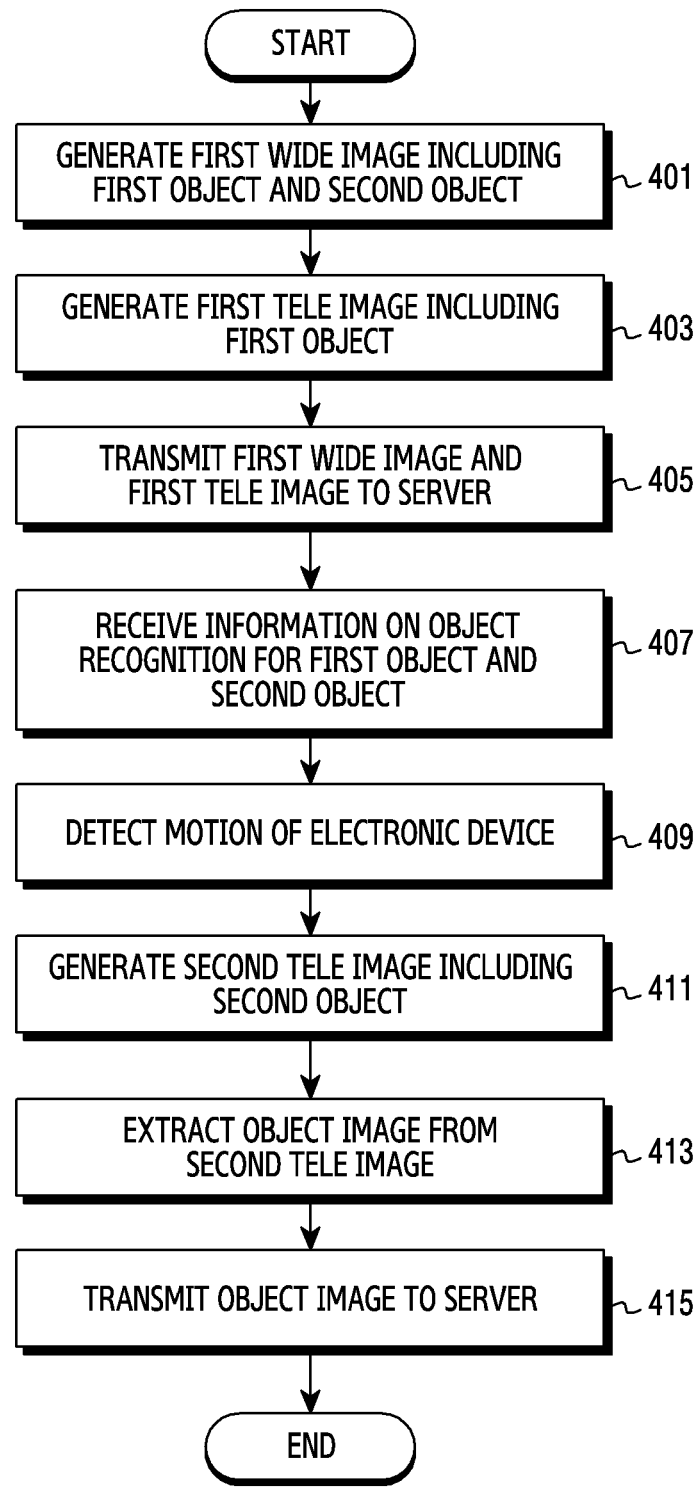
FIG. 4A is a flowchart illustrating the operation for recognizing an object by an electronic device, according to an embodiment.

FIG. 4A is a flowchart illustrating the operation for recognizing an object by an electronic device, according to an embodiment. Steps 401 to 415 of FIG. 4A may be performed by, for example, the electronic device 101 of FIG. 1 or the electronic device 301 of FIG. 3A. Hereinafter, steps 401 to 415 may be implemented by instructions (commands) which can be executed by the processor 120 of the electronic device 101.

Figure 4B:
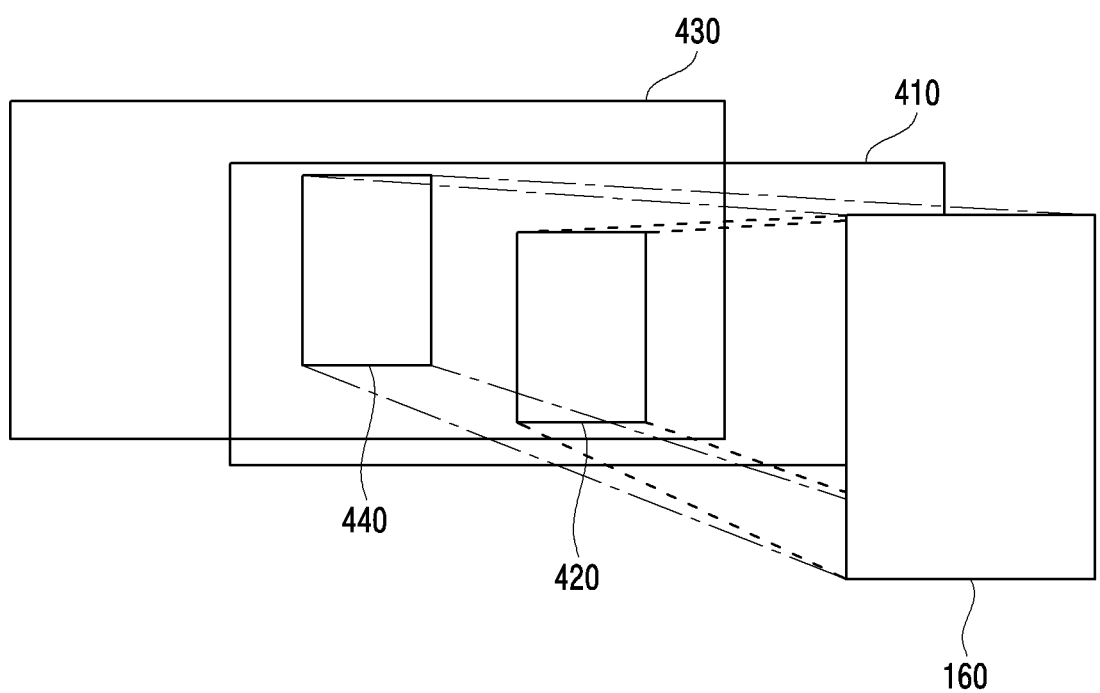
FIG. 4B is a conceptual diagram illustrating a preview image changed, according to movement of an electronic device according to an embodiment.

Referring to FIG. 4A, in step 401, the processor 120 of the electronic device 101 generates a first wide image 410 including the first object 331 to the third object 333. The first wide image 410 may correspond to the first image 330 acquired by the first camera 310. The first camera 310 may be a camera corresponding to a wide FOV, and accordingly the electronic device 101 may acquire the first image 330 including a plurality of objects (for example, the first object 331 to the third object 333). For example, referring to FIG. 4B, the first image may correspond to the first wide image 410. The first wide image 410 may be an image at a first time point acquired through the first camera 310. That is, the first image 330 may include a still image acquired at the first time point through the first camera 310, and the first camera 310 may be a camera corresponding to a wide FOV and thus may acquire an image including the plurality of objects.

In step 403, the electronic device 101 generates a first tele image 420 including the first object 331. The first tele image 420 may correspond to the second image 340 acquired by the second camera 320. For example, referring to FIG. 4B, the second image 340 may correspond to the first tele image 420. The first tele image 420 may be an image at the first time point acquired through the second camera 320. That is, the first image 330 and the second image 340 may be acquired the same time point corresponding to the first time point. The camera module 180 of the electronic device 101 may include two or more image signal processors 181 configured in parallel to process the first image 330 and the second image 340 at the first time point, the buffer 183, and resizers 185. The second image 340 is an image acquired by the second camera 320 corresponding to a narrow FOV and thus may include only the first object 331 except for the second object 332 and the third object 333.

The user of the electronic device 101 may adjust magnification of a preview image. In the case of a predetermined magnification or smaller, the electronic device 101 may display the image received through the first camera 310 in the form of a preview image. In the case of a predetermined magnification or larger, the electronic device 101 may display the image received through the second camera 320 in the form of a preview image.

The electronic device 101 may receive and process the images through the first camera 310 and the second camera 320 at the same time. That is, at the same time point corresponding to the first time point, the first camera 310 may receive the first wide image 410 corresponding to a wide area and the second camera 320 may receive the first tele image 420 corresponding to a narrow area. The electronic device 101 may convert the images received at the first time point through the first camera 310 and the second camera 320 into the first image 330 and the second image 340 through the two or more image signal processors 181 configured in parallel, the buffer 183, and the resizers 185.

In step 405, the electronic device 101 transmits the first wide image 410 and the first tele image 420 to the server 108. The electronic device 101 may transmit the first image 330 and the first tele image 420 to the server 108 in order to perform object recognition on the first object 331 to the third object 333 included in the first wide image 410. The server 108 may include an image analysis engine and perform object recognition on the first object 331 to the third object 333 included in the first wide image 410 and the first tele image 420 received from the electronic device 101.

The server 108 may receive the first image 330 having a wide FOV of low magnification and extract key points of the plurality of objects included in the first image 330 so as to determine the type (for example, cylindrical container, tubular container, person, puppy, and piano, etc.) corresponding to each of the plurality of objects. For example, referring to FIG. 4C, the server may receive the first wide image 410 which is photographed with low magnification and corresponds to the wide FOV and recognize the first object 331 to the third object 333. The server 108 may extract key points of the first object 331 to the third object 333 and determine the type of each of the first object 331 to the third object 333. For example, the server 108 may determine that each of the first object 331 to the third object 333 corresponds to the cylindrical container.

The server 108 may receive the second image 340 which is photographed with a high magnification and pertains to the first object 331 corresponding to the narrow FOV, and the server 108 may acquire additional information. For example, referring to FIG. 4C, the server may receive the first tele image 420, which is photographed with a high magnification and corresponds to the narrow FOV, and identify the first object 331. The server 108 may generate additional recognition information on the basis of information which can be acquired through being photographed with a high magnification. For example, the server 108 may identify a product name of an object (for example, the first object 331) included in the first tele image 420. Accordingly, the server 108 may transmit information on the additional recognition result which can be provided on the basis of the identified product name to the electronic device 101. For example, the server 108 may identify a product name of the first object 331 and additionally transmit information on the identified product name of the first object 331, a price of the product sold on an online market, and a price of the product sold in a convenience store near the electronic device 101 to the electronic device 101.

In the above-described embodiment, the first image 330 and the second image 340 are transmitted to the server 108, but the disclosure is not limited thereto. According to another embodiment, the electronic device 101 may perform object recognition on the first object 331 to the third object 333 included in the first image 330 or the second image 340 on the basis of the image recognition engine 210 (AIR framework) included in the service module 200.

In step 407, the electronic device 101 receives information on the recognition object performed on the first object 331. The server 108 may perform object recognition on the first wide image 410 and the first tele image 420 received from the electronic device 101 and transmit information on the recognized object to the electronic device 101. The recognition information of the first wide image 410 may include information on types of the first object 331 to the third object 333 included in the first wide image 410. For example, the types of the first object 331 to the third object 333 may correspond to the cylindrical container. The recognition information of the first tele image 420 may include information on the product name of the first object 331 included in the first tele image 420, the price of the product sold on the online market, and the price of the product sold in the convenience store near the electronic device 101.

In step 409, the electronic device 101 detects motion of the electronic device 101. The electronic device 101 may acquire sensing data on motion of the electronic device 101 through the sensor module 176. The sensor module 176 may further include a gyro sensor, an acceleration sensor, and a gravity sensor. For example, the electronic device 101 may acquire sensing data related to each speed measured by the gyro sensor and identify how much the electronic device 101 rotates leftwardly or rightwardly on the basis of the sensing data. In another example, the electronic device 101 may acquire sensing data measured by the gravity sensor and identify how much the electronic device 101 moves upwardly or downwardly on the basis of the sensing data. The electronic device 101 may detect motion thereof by acquiring sensing data on leftward and rightward rotation and sensing data on the upward and downward rotation.

Figure 4C:
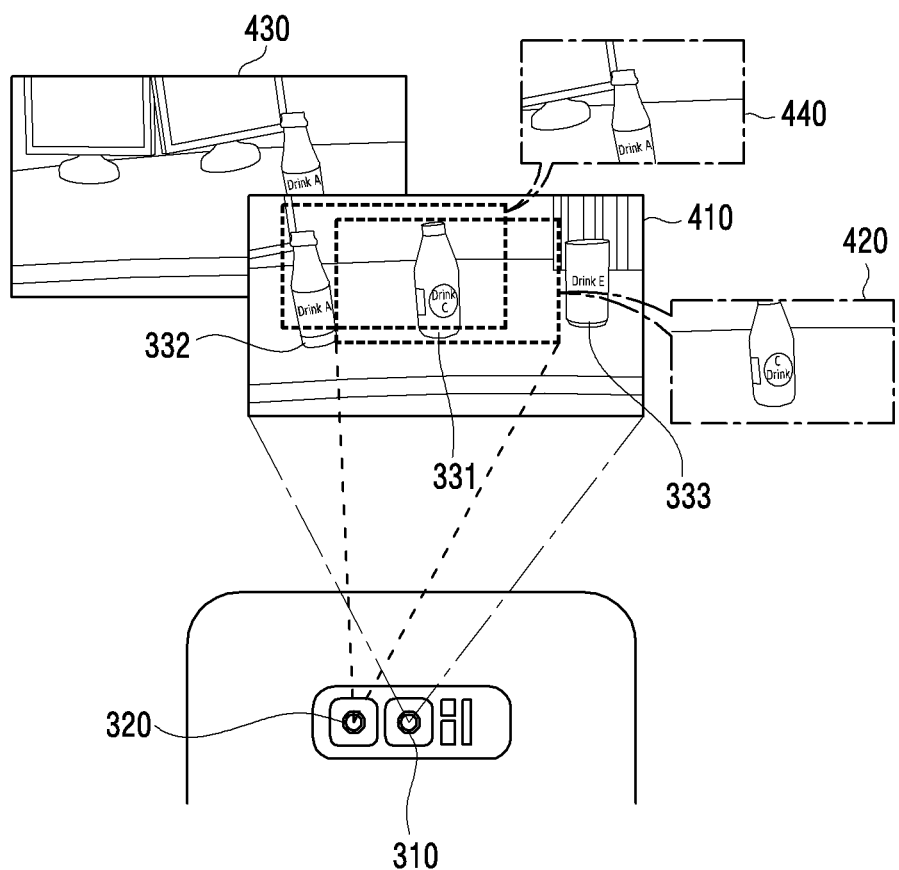
FIG. 4C illustrates an example of a preview image changed by movement of an electronic device, according to an embodiment.

In step 411, the electronic device 101 generates a second tele image 440 including the second object 332. The second tele image 440 may correspond to an image acquired through the second camera 320 at a second time point after the detected motion of the electronic device 101. For example, referring to FIG. 4B, the second tele image 440 may correspond to an image acquired by the second camera 320 corresponding to the narrow FOV after the motion of the electronic device 101. Referring to FIG. 4C, the second tele image 440 may correspond to an image including the second object 332.

The electronic device 101 may generate the second tele image 440 on the basis of zoom information of the first wide image 410 and the first tele image 420 and information on the motion of the electronic device 101. The electronic device 101 may determine whether the second tele image 440 is located within the first wide image 410 on the basis of information on zoom magnification of the second camera 320 and the information on the motion. Accordingly, when it is determined that the second tele image 440 is located within the first wide image 410, the electronic device 101 may not generate the second wide image 430 by not processing the image received from the second camera 320.

Further, when it is determined that the second tele image 440 is not located within the first wide image 410, the electronic device 101 may generate the second wide image 430 by processing the image received from the second camera 320. In order to acquire information on types of objects included in the newly generated second wide image 430, the electronic device 101 may transmit the generated second wide image 430 to the server 108 or use the image recognition engine 210 of the electronic device 101.

In step 413, the electronic device 101 extracts an object image from the second tele image 440. The object image may be an image corresponding to a partial area of the second tele image 440. Specifically, the object image may be an image for an area including an object in the second tele image 440. The electronic device 101 may extract key points of the second object 332 in the second tele image 440 and the second object 332 in the first wide image 410 and compare the extracted key points so as to acquire the number of matching key points. When the number of matching key points is greater than or equal to a preset number, the electronic device 101 may determine that the second object 332 of the first wide image 410 is the same as the second object 332 of the second tele image 440. When it is determined that the second object 332 of the first wide image 410 is the same as the second object 332 of the second tele image 440, the electronic device 101 may acquire coordinate information related to the second object 332 included in the second tele image 440 on the basis of the extracted key points. The electronic device 101 may extract a partial area in which the second object 332 is located in the second tele image 440 on the basis of the acquired coordinate information. The extracted partial area corresponding to the second object 332 may correspond to the object image.

In step 415, the electronic device 101 transmits the object image to the server 108. The electronic device 101 may transmit the object image extracted from the second tele image 440 to the server 108. The object image may be an image corresponding to a partial area of the second tele image 440 or may include only an area related to the second object 332 of the second tele image 440. The electronic device 101 may determine that the second object 332 of the first wide image 410 corresponds to the second object 332 of the second tele image 440 in which case the electronic device 101 may determine that type information of the second object 332 in the recognition information of the first wide image 410 is type information of the second object 332 of the second tele image 440. Accordingly, the electronic device 101 may transmit the object image and the type information of the second object 332 to the server 108. Therefore, the electronic device 101 may reduce an amount of data exchanged through communication with the server 108, and the server 108 may perform recognition on the second object 332 on the basis of the object image including only an area for the second object 221 in the second tele image 440, thereby improving a speed of the object recognition.

Figure 5A:
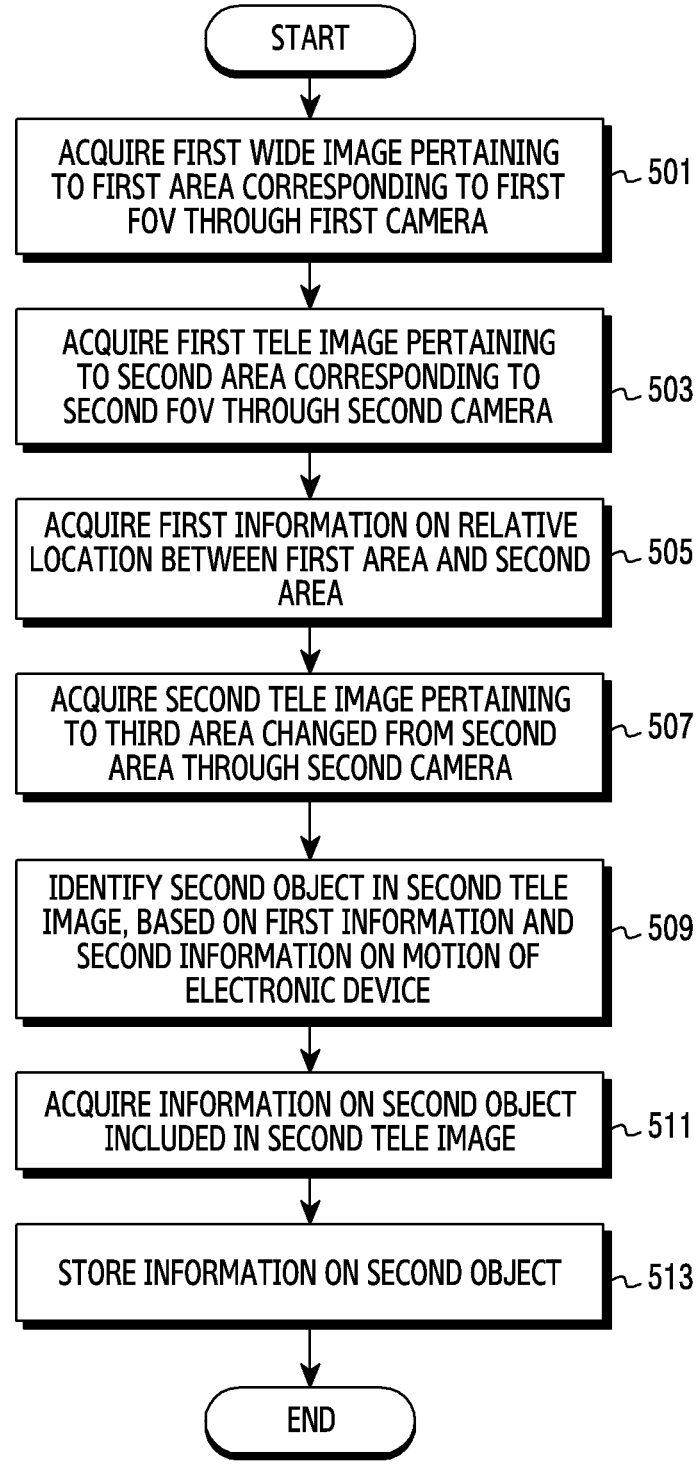
FIG. 5A is a flowchart illustrating the operation for recognizing an object by an electronic device, according to an embodiment.

FIG. 5A is a flowchart illustrating the operation for recognizing an object by an electronic device, according to an embodiment. Steps 501 to 513 of FIG. 5A may be performed by, for example, the electronic device 101 of FIG. 1 or the electronic device 301 of FIG. 3A. Steps 501 to 513 may be implemented by instructions (commands) which can be executed by the processor 120 of the electronic device 101.

Figure 5B:
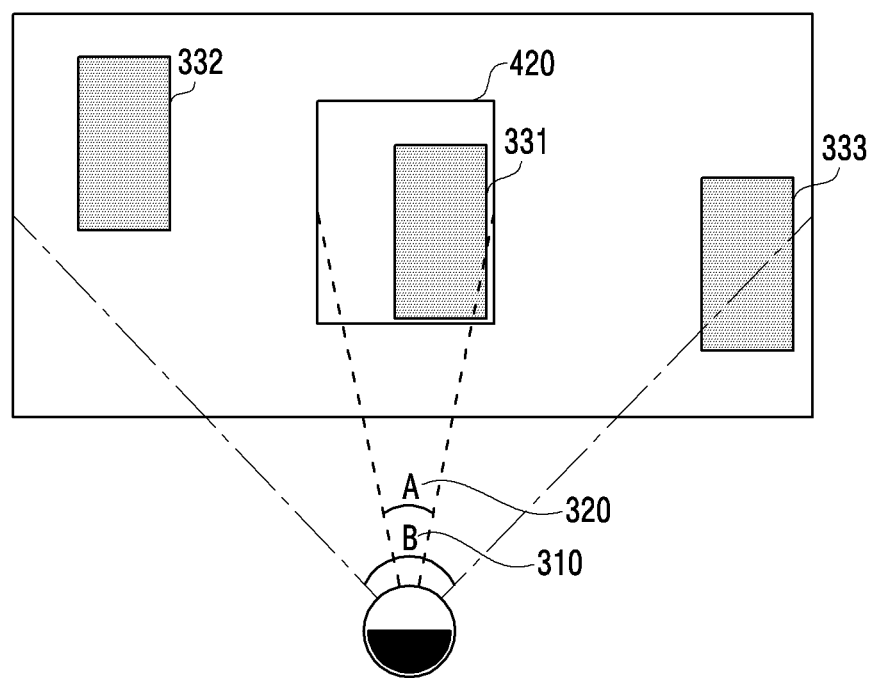
FIG. 5B illustrates an image received before a motion of an electronic device, according to an embodiment.

Referring to FIG. 5A, in step 501, the processor 120 of the electronic device 101 acquires the first wide image 410 pertaining to a first area corresponding to a first FOV through the first camera 310. The electronic device 101 may acquire the first wide image 410 including the first object 331 to the third object 333 arranged in the first area corresponding to the wide FOV. For example, referring to FIG. 5B, the FOV of the first camera 310 may have angle B 510 and may acquire an image including the first object 331, the second object 332, and the third object 333.

In step 503, the electronic device 101 acquires the first tele image 420 pertaining to a second area corresponding to a second FOV through the second camera 320. The electronic device 101 may acquire the first tele image 420 pertaining to the second area corresponding to the second FOV through the second camera 320. The electronic device 101 may acquire the first tele image 420 including the first object 331 arranged in the second area corresponding to the narrow FOV. For example, referring to FIG. 5B, the FOV of the second camera 320 may have angle A 520 and acquire an image including only the first object 331.

In step 505, the electronic device 101 acquires first information on a relative location between the first area and the second area. The electronic device 101 may acquire information on the relative location of the second area in the first area. That is, the electronic device 101 may acquire first information on the relative location by identifying the second area corresponding to a partial area of the first area. For example, the first information may include information indicating that the second area is located at the center or the upper right part of the first area.

Figure 5C:
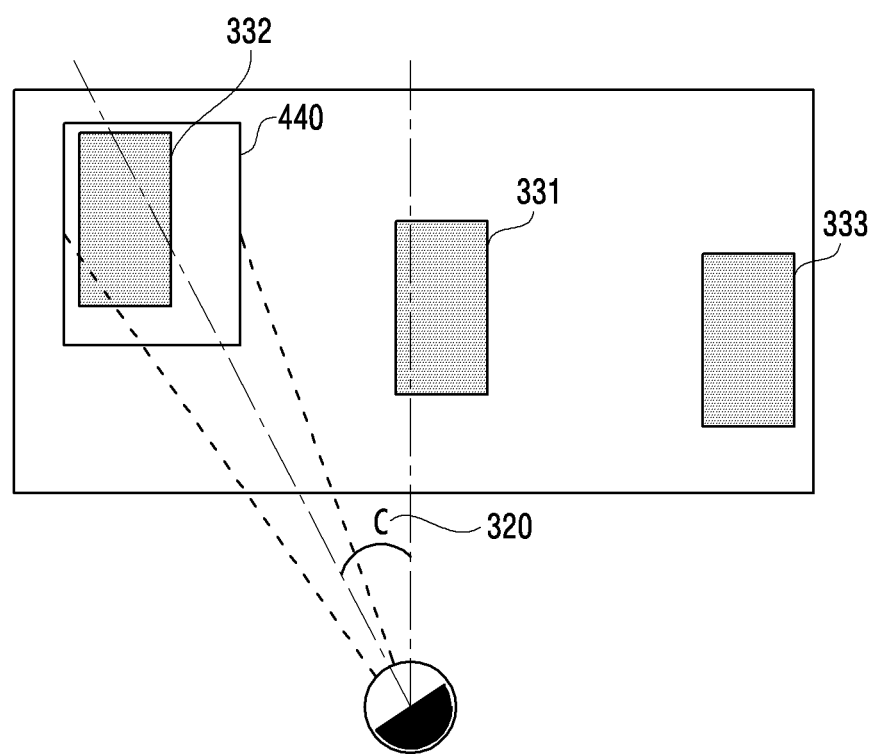
FIG. 5C illustrates an image received after a motion of an electronic device, according to an embodiment.

In step 507, the electronic device 101 acquires the second tele image 440 pertaining to a third area changed from the second area through the second camera 320. The electronic device 101 may detect motion through the sensor module 176 and acquire the second tele image 440 pertaining to the third area corresponding to the changed second FOV of the second camera 320 on the basis of second information of the detected motion. The second information may correspond to information received from the sensor module 176 and may include information on the size of leftward and rightward motion of the electronic device 101 and the size of upward and downward motion of the electronic device 101. For example, referring to FIG. 5C, the processor of the electronic device may detect a leftward rotation of the electronic device by angle C 530. The electronic device 101 may acquire the image including the second object 332 which is not detected in the first tele image 420 before the motion of the electronic device 101, but the second object 332 is newly detected in the second tele image 440 in response to the motion through the second camera 320.

In step 509, the electronic device 101 identifies the second object 332 in the second tele image 440 on the basis of first information and second information. The electronic device 101 may determine the location of the second tele image 440 on the basis of the first information on the location of the first tele image 420 within the first wide image 410 and the second information on the motion of the electronic device 101. When the determined location of the second tele image 440 leaves the first wide image 410, the electronic device 101 may newly generate the second wide image corresponding to the wide FOV. When the determined location of the second tele image 440 does not leave the first wide image 410, the electronic device 101 may identify the second object 332 included in the second tele image 440 changed according to the motion of the electronic device 101. The second object 332 may correspond to one of the objects included in the first wide image 410.

In step 511, the electronic device 101 acquires information on the second object 332 included in the second tele image 440. The electronic device 101 may extract key points of the second object 332 in the second tele image 440 and the second object 332 in the first wide image 410 and compare the extracted key points so as to acquire the number of matching key points. When the number of matching key points is greater than or equal to a preset number, the electronic device 101 may determine that the second object 332 of the first wide image 410 is the same as the second object 332 of the second tele image 440. When it is determined that the second object 332 of the first wide image 410 is the same as the second object 332 of the second tele image 440, the electronic device 101 may acquire coordinate information related to the second object 332 included in the second tele image 440 on the basis of the extracted key points. The electronic device 101 may extract a partial area in which the second object 332 is located in the second tele image 440 on the basis of the acquired coordinate information.

In step 513, the electronic device 101 may store information on the second object 332. The electronic device 101 may store the extracted partial area as the object image of the second object 332. Further, the electronic device 101 may use information on the second object 332 included in the recognition information of the first wide image 410 as type information of the second object 332. The electronic device 101 may additionally store accuracy of the object recognition, the previously performed object recognition and information on user feedback therefor as accuracy of the object recognition, and use the same for the object recognition. For example, when accuracy of the previously performed object recognition is exceeds a predefined reference value, the electronic device 101 may directly display object information since a misrecognition probability of the object recognition for the corresponding object is low. In another example, when accuracy of the previously performed object recognition is lower than or equal to a predefined reference value, a misrecognition probability of object recognition for the corresponding object is high, so that the electronic device 101 may be configured to recognize the corresponding object one more time through an image for the object acquired by the second camera with high magnification. In this case, when results of a re-recognized object and a pre-recognized object are the same as each other, object information may be displayed.

Figure 6:
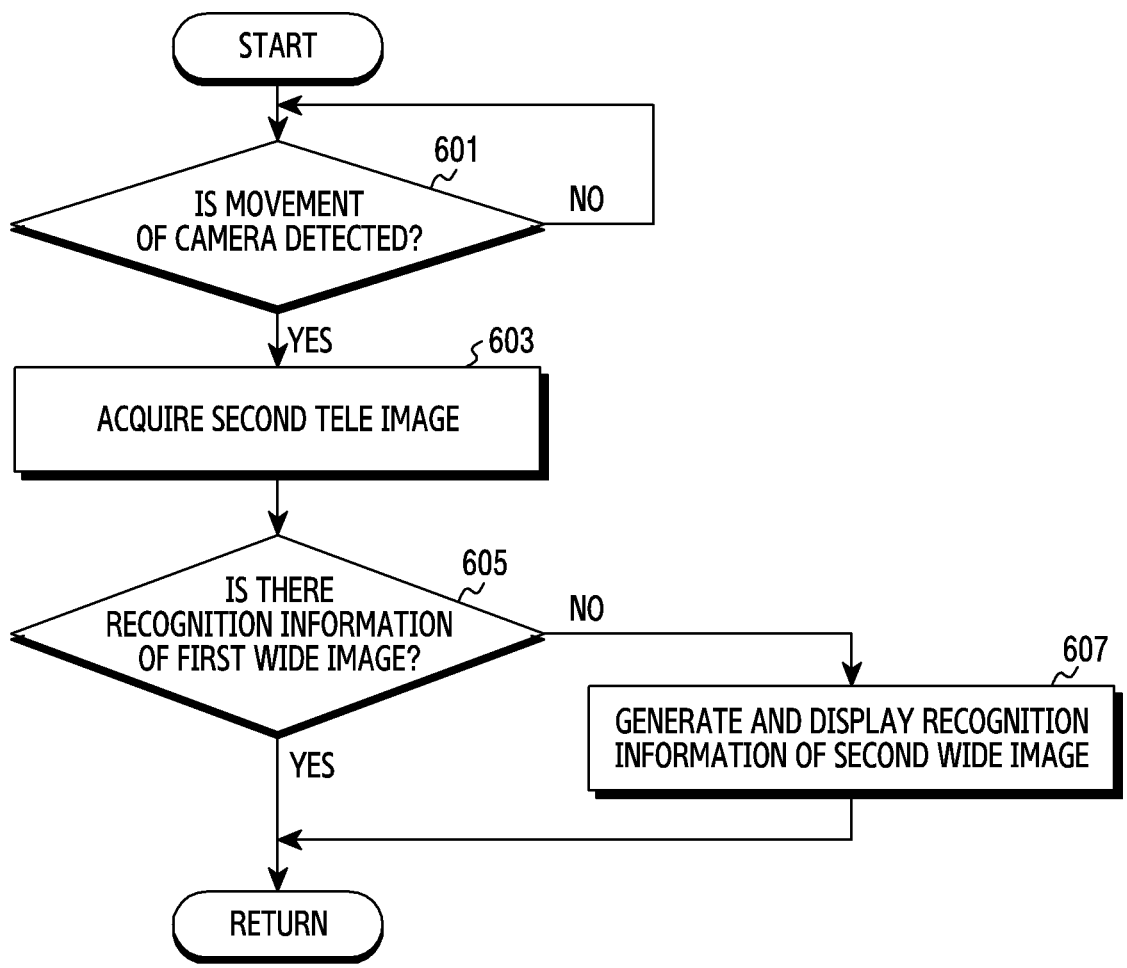
FIG. 6 is a flowchart illustrating the operation of an electronic device for acquiring the second tele image, according to an embodiment.

FIG. 6 is a flowchart illustrating the operation of the electronic device for acquiring the second tele image, according to an embodiment. The operation for acquiring the second tele image may correspond to a detailed description of step 507 illustrated in FIG. 5A.

Referring to FIG. 6, in step 601, the processor 120 of the electronic device 101 determines whether motion of the camera is detected. The electronic device 101 may acquire sensing data from the sensor module 176 and detect motion of the electronic device 101 on the basis of the sensing data. The first camera 310 and the second camera 320 are located on one surface of the housing of the electronic device 101. When the first camera 310 and the second camera 320 detect motion of the electronic device 101, the electronic device 101 may detect movement of the first camera 310 and the second camera 320. For example, when motion of the electronic device 101 is detected, the electronic device 101 performs step 603. In another example, when no motion of the electronic device 101 is detected, the electronic device 101 continuously identifies whether motion of the electronic device 101 is detected.

In step 603, the electronic device 101 acquires the second tele image 440. Images received through the first camera 310 and the second camera 320 may be changed depending on the detected motion of the electronic device 101. For example, referring to FIG. 4C, the first camera 310 may acquire the first wide image 410 before the movement of the electronic device and may acquire the second wide image 430, which is changed according to the movement of the electronic device 101. The second camera 320 may acquire the first tele image 420 before the movement of the electronic device 101 and acquire the second tele image 440, which is changed according to the movement of the electronic device 101.

In step 605, the electronic device 101 determines whether recognition information of the first wide image 410 exists. The electronic device 101 may acquire the first wide image 410 through the first camera 310 and transmit the acquired first wide image 410 to the server 108. Accordingly, the electronic device 101 may determine whether recognition information of the first wide image 410 performed by the server 108 is received in response to the transmission. The recognition information of the first wide image 410 may include type information of a plurality of objects included in the first wide image 410. For example, the recognition information of the first wide image 410 may include information indicating that types of the first object 331 to the third object 333 correspond to the cylindrical container.

In step 607, the electronic device 101 generates and displays recognition information of the second wide image 430. When the recognition information of the first wide image 410 is not received from the server 108, the electronic device 101 cannot generate recognition information of the second tele image 440 through the recognition information of the first wide image 410. Accordingly, the electronic device 101 may transmit the second wide image 430 to the server 108 and receive the result of the object recognition performed by the server 108 so as to acquire and display the recognition information of the second wide image 430.

Figure 7:
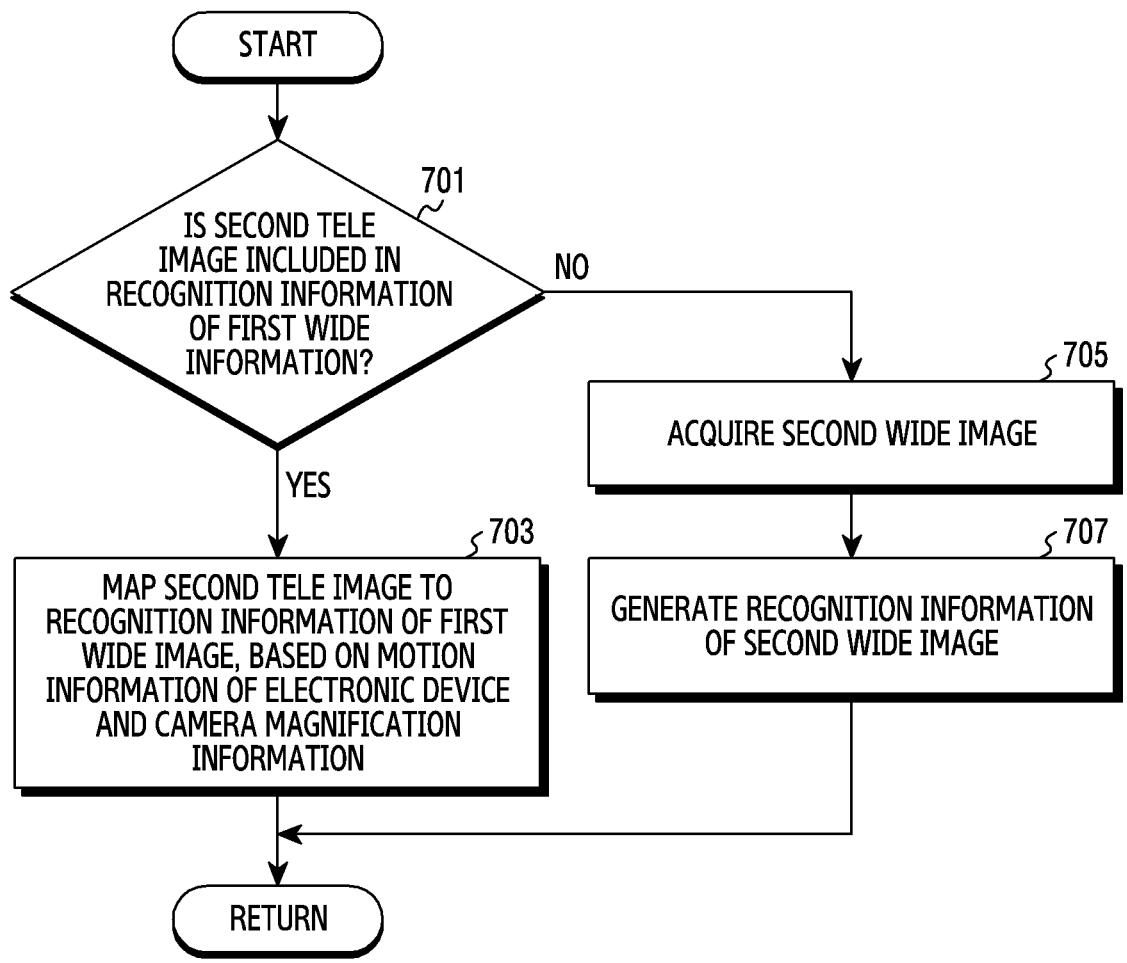
FIG. 7 is a flowchart illustrating the operation of an electronic device for identifying the second object in the second tele image, according to an embodiment.

FIG. 7 is a flowchart illustrating the operation of the electronic device for identifying the second object in the second tele image, according to an embodiment. The operation for identifying the second object may correspond to a detailed description of step 509 illustrated in FIG. 5A.

Referring to FIG. 7, in step 701, the processor 120 of the electronic device 101 determines whether the second tele image 440 is included in recognition information of the first wide image 410 on the basis of motion. The electronic device 101 may acquire information on the motion of the electronic device 101 through the sensor module 176 (for example, a gyro sensor). The electronic device 101 may determine, based on information on the motion, whether the second tele image 440 acquired by the second camera after the motion is included in the first wide image 410 acquired by the first camera 310 before the motion. The electronic device 101 may determine whether the second tele image 440 acquired by the second camera 320 is included in the first wide image 410 acquired by the first camera 310 before the motion on the basis of zoom information, information on the motion of the electronic device 101, and relative location information of the second image 420 acquired by the second camera 320 in the first image 410 acquired by the first camera 310 before the motion of the electronic device 101.

The electronic device 101 may determine whether the second tele image 440 is included in the first wide image 410 on the basis of zoom information of the first camera 310 and the second camera 320. For example, when zoom information of the second camera 320 corresponds to 4× optical zoom and the area (for example, 311 of FIG. 3A) of the first wide image 410 is 100, the area (for example, 321 of FIG. 3A) of the first tele image 420 and the second tele image 440 may correspond to 25. When zoom information of the second camera 320 corresponds to 10× zoom, the area of the first tele image 420 and the second tele image 440 may correspond to 10. In the case of 10× zoom, an area occupied by the second tele image 440 in the first wide image 410 is very small, and accordingly, in spite of a relatively large motion of the electronic device 101, the second tele image 440 may be included in the first wide image 410. On the other hand, in the case of 4× zoom, an area occupied by the second tele image 440 in the first wide image 410 may be greater than or equal to a predetermined size. Accordingly, in spite of relatively small motion of the electronic device 101, the second tele image 440 may include an image which is not included in the first wide image 410.

In addition, the electronic device 101 may determine whether the second tele image 440 is included in the first wide image 410 on the basis of relative location information of the first tele image 420 in the first wide image 410. For example, when the first tele image 420 is located on the right part of the first wide image 410 before the motion, the electronic device 101 may still be located within the first wide image 410 even though there is a relatively large motion in a left direction. In another example, when the first tele image 420 is located on the left part in the first wide image 410 before the motion of the electronic device 101, the electronic device 101 may still be located within the first wide image 410, even though there is relatively large motion in a right direction. Accordingly, the electronic device 101 may determine whether the second tele image 440 is included in the first wide image 410 on the basis of relative location information of the first tele image 420 in the first wide image 410, zoom information of the first camera 310 and the second camera 320, and information on the motion of the electronic device.

In step 703, the electronic device 101 maps the second tele image 440 as recognition information of the first wide image 410 on the basis of motion information of the electronic device 101 and camera magnification information. The electronic device 101 may extract key points of the second object 332 included in the first wide image 410 and extract key points of the second object 332 included in the second tele image 440 so as to acquire the number of matching key points. Since the first camera 310 and the second camera 320 correspond to different magnifications, the electronic device 101 may fail in extracting matching key points if the key points are compared without consideration of magnification information. Accordingly, the electronic device 101 may extract matching key points on the basis of first zoom information and second zoom information for the magnification. When the number of matching key points is greater than or equal to a predefined number, the electronic device 101 may determine that the second object 332 in the first wide image 410 is the same as the second object 332 in the second tele image 440 and map recognition information of the second object 332 among the recognition information of the first wide image 40 as recognition information of the second object 332 of the second tele image 440.

In step 705, the electronic device 101 acquires the second wide image 430. When the second tele image 440 is not included in the recognition information of the first wide image 410, the electronic device 101 may acquire the second wide image 430 through the first camera 310 in order to recognize a new object. The second wide image 430 may correspond to the image acquired by the camera corresponding to the wide FOV. The electronic device 101 may adaptively change an operation period for generating recognition information of the second wide image 430 on the basis of information on the motion of the electronic device 101. For example, the electronic device 101 may acquire information on how fast the electronic device 101 moves through an acceleration sensor included in the sensor module 176. When it is determined that the electronic device 101 moves faster than a predetermined speed on the basis of information received from the acceleration sensor, the electronic device 101 may not perform an operation for determining whether the second tele image 440 is included in the first wide image 410. When the electronic device 101 moves fast, in most cases the second tele image 440 at the second time point may be not included in the first wide image 410 at the first time point, and the electronic device 101 may omit the operation for determining whether the second tele image 440 is included in the first wide image 410 and operate to acquire object recognition information by transmitting the second wide image 430 to the server 108. In another example, when it is determined that the electronic device 101 moves more slowly than a predefined speed on the basis of information received from the acceleration sensor, the electronic device 101 may operate to determine whether the second tele image 440 is included in the first wide image 410. This is because, when the electronic device 101 moves slowly, the second tele image 440 is very likely to be included in the first wide image 410 according to an operation period.

In step 707, the electronic device 101 generates recognition information of the second tele image 440. That is, the electronic device 101 may transmit the second tele image 440 to the server 108 in order to acquire recognition information of a plurality of objects included in the second tele image 440 acquired according to the motion. The server 108 may receive the second tele image 440 and perform an object recognition process based on the image recognition engine. Thereafter, as the server 108 transmits the result of the object recognition process for the second tele image 440 to the electronic device 101, the electronic device 101 may acquire recognition information of the second tele image 440. The electronic device 101 may generate recognition information of the second tele image 440 on the basis of the image recognition engine 210 included in the service module 200 of the electronic device 101 instead of transmitting the second tele image 440 to the server 108.

Figure 8:
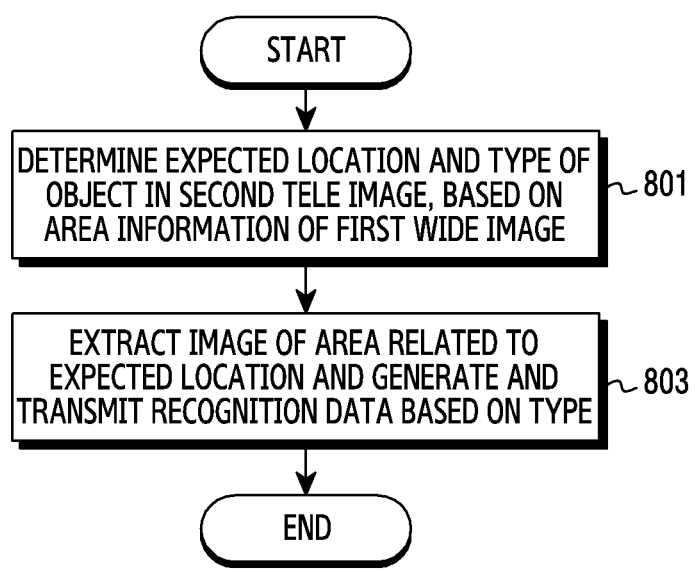
FIG. 8 is a flowchart illustrating the operation for acquiring information on a first object included in a first wide image by an electronic device, according to an embodiment.

FIG. 8 is a flowchart illustrating the operation for acquiring information on the second object included in the third image by the electronic device, according to an embodiment. The operation for acquiring the information on the second object 332 may correspond to a detailed description of step 511 illustrated in FIG. 5A.

In step 801, the processor 120 of the electronic device 101 determines an expected location and type of the second object 332 in the second tele image 440 on the basis of area information of the first wide image 410. When the second tele image 440 acquired after motion of the electronic device 101 is included in recognition information of the first wide image 410, the electronic device 101 may recognize the second object 332 of the second tele image 440 on the basis of recognition information of the first wide image.

The electronic device 101 may determine the expected location of the second object 332 included in the third image. For example, the electronic device 101 may determine the size of an area in which the second tele image 440 is located in the first wide image 410 through zoom information of the second camera 320. Further, the electronic device 101 may determine the expected location of the second tele image 440 in the first wide image 410 on the basis of area information on the location of the first tele image 420 in the first wide image 410 and information on the motion of the electronic device 101. For example, the first tele image 420 before the electronic device 101 moves may be located at the center of the first wide image 410 and the electronic device 101 may move leftwardly by 1 cm and upwardly 1 cm. The electronic device 101 may determine the expected location of the second tele image 440 after the motion is located in an area 1 cm to the left and 1 cm to the top from the center of the first wide image 410. The electronic device 101 may determine the type of the second object 332 of the second tele image 440 on the basis of type information included in the recognition information of the first wide image 410. The electronic device 101 may compare the second object 332 at the acquired expected location within the first wide image 410 with the second object 332 of the second tele image 440 and determine whether to use type information of the second object 332 of the first wide image 410 as type information of the second object 332 of the second tele image 440. For example, the electronic device 101 may determine that the second object 332 corresponding to the expected location of the first wide image 410 is the same as the second object 332 included in the second tele image 440 through resizing according to zoom information, and extraction and comparison of key points. When the second object 332 corresponding to the expected location of the first wide image 410 is the same as the second object 332 included in the second tele image 440, the electronic device 101 may determine that the type information of the second object 332 included in the recognition information of the first wide image 410 is the same as the type information of the second object 332 of the second tele image 440 without transmitting the second wide image 430 to the server 108 to identify the type of the second object 332 of the second tele image 440.

According to an embodiment, the electronic device 101 may determine whether key points match each other on the basis of information on magnification of the first camera 310 and the second camera 320. For example, the electronic device 101 may extract key points of the second object 332 of the first wide image 410 and key points of the second object 332 of the second tele image 440 and compare the key points on the basis of information on the magnification. When the electronic device 101 compares the key points extracted from the first wide image 410 with the key points extracted from the second tele image 440 without consideration of the information on the magnification, the electronic device 101 may fail in matching the key points even though the second objects 332 are actually the same as each other. Accordingly, the electronic device 101 may reduce the key points extracted from the second tele image 440 according to magnification of the first camera 310 and then compare the reduced key points with the key points of the first wide image 410 or may enlarge the key points of the second object 332 extracted from the first wide image 410 according to a magnification of the second camera 320 and then compare the enlarged key points with the key points extracted from the second tele image 440. Accordingly, the electronic device 101 may match the key points in consideration of a magnification difference between the first camera 310 and the second camera 320 having different magnifications.

In step 803, the electronic device 101 extracts a partial image related to the determined expected location of the second object 332 and generates and transmits recognition data based on the type. For example, in order to recognize the second object 332 included in the second tele image 440, the electronic device 101 may acquire an object image by extracting only a partial area of the second tele image 440 corresponding to the second object 332 on the basis of the expected area of the first wide image 410 without transmitting the second wide image 430 to the server 108, and may transmit the object image to the server 108. Further, the electronic device 101 may transmit type information of the second object 332 included in the recognition information of the first wide image 410 together with the object image to the server 108. Accordingly, the server 108 may recognize the second object 332 on the basis of the object image including only the second object 332 and type information of the second object 332. For example, the server 108 may not perform object recognition processing on the whole image of the second wide image 430 and generate recognition information of drink A for the second object 332 corresponding to the cylindrical container on the basis of the object image 440 for an area (for example, an area including text of drink A) including only the second object 332 included in the second tele image 440 and the type information (for example, a cylindrical container) and transmit the generated recognition information to the electronic device 101.

Figure 9:
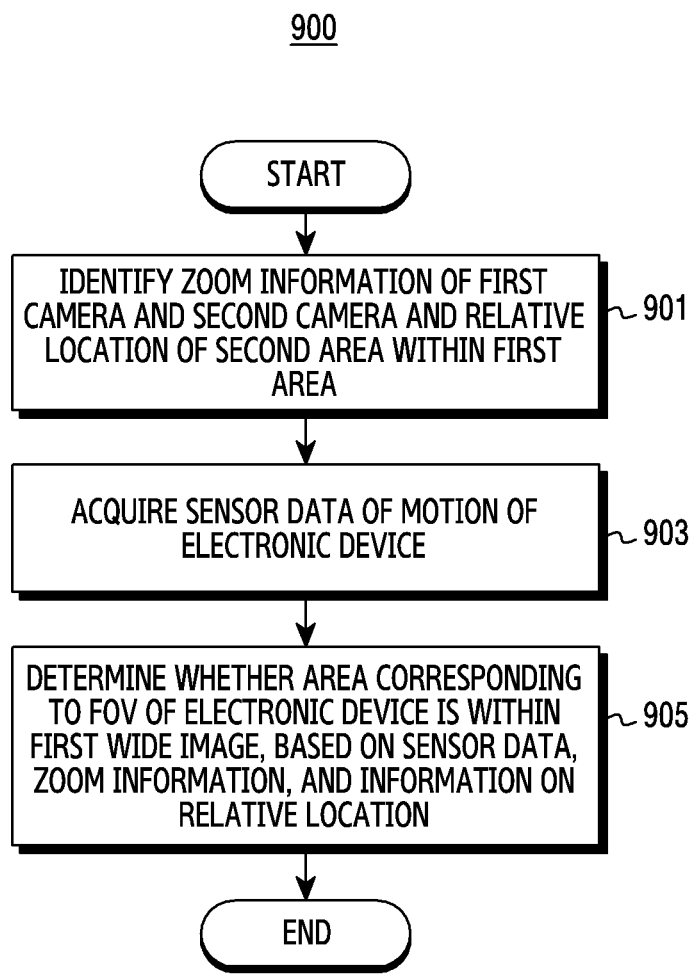
FIG. 9 is a flowchart illustrating the operation for determining whether a second tele image is included in recognition information of a first wide image by an electronic device, according to an embodiment.

FIG. 9 is a flowchart illustrating the operation for determining whether the second tele image is included in recognition information of the first wide image of the electronic device, according to an embodiment. The steps of FIG. 9 may be included step 701 illustrated in FIG. 7. The steps illustrated in FIG. 9 may be performed by the processor 120 illustrated in FIG. 1.

In step 901, the processor 120 identifies zoom information and a relative location. The processor 120 may identify information on magnification of the first camera 310 and the second camera 320. For example, the first camera 310 corresponding to a wide FOV may correspond to magnification of 1× to 2×. In another example, the second camera 320 corresponding to a narrow FOV may correspond to magnification of 2× to 4×. The processor 120 may identify a relative location of a second area in a first area. The first area may include an area of an image acquired by the first camera 310. The second area may include an area of an image acquired by the second camera 320. For example, the first area may be an area included in the first wide image 410. In another example, the second area may be an area included in the first tele image 420.

In step 903, the processor 120 acquires sensor data of motion of the electronic device 101. The processor 120 may acquire data on motion of the electronic device 101 from the sensor module 176. For example, the sensor module 176 may include an acceleration sensor and a gyro sensor. The acceleration sensor may include sensing data on a change in a speed of the electronic device 101. The gyro sensor may acquire sensing data on a tilt of the electronic device 101. The sensing data on the tilt may include data indicating an amount of a change related to pitch, roll, and yaw.

In step 905, the processor 120 determines whether a third area corresponding to a FOV of the second camera 320 at a second time point after motion of the electronic device is located within the first wide image on the basis of sensor data, zoom information, and information on the relative location. The processor 120 may predict a third area corresponding to a FOV of the second camera 320 at a second time point after motion of the electronic device 101 on the basis of the sensor data and the zoom information. For example, the processor 120 may acquire information on motion of the electronic device 101, that is, motion of the first camera 310 and the second camera 320 on the basis of sensing data on the change in the speed of the electronic device 101 and sensing data on the tilt of the electronic device 101. The processor 120 may determine the third area predicted at the second time point on the basis of the acquired information on motion of the second camera 310, zoom information of the second camera 320, and information on the relative location. For example, when the second area is located on the left part in the first area, the processor may determine that the second area is more likely to be located within the first area in the case in which the electronic device 101 moves rightwardly than in the case in which the electronic device 101 moves leftwardly. In another example, when magnification of the second camera 320 corresponds to a high magnification, the processor 120 may determine that the size of the second area is smaller than the first area. The processor 120 may configure a threshold value for motion of the electronic device 101 leaving the first area to be large on the basis of the size of the second area.

Figure 10A:
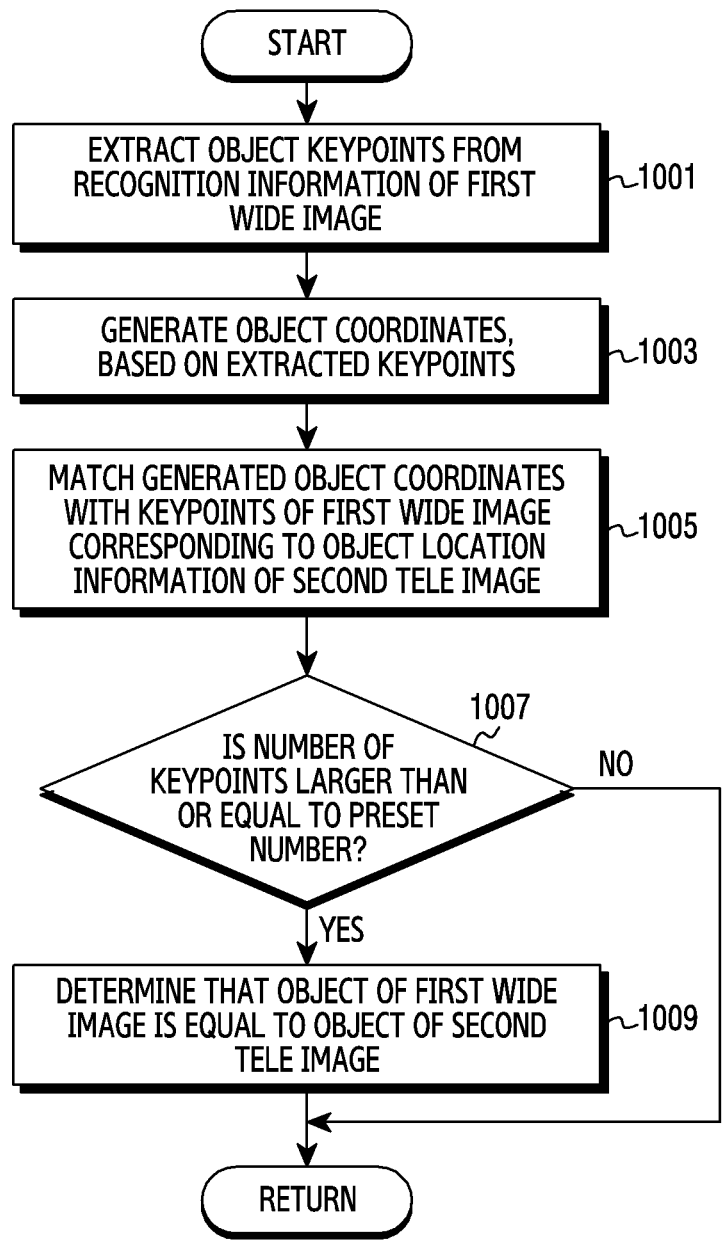
FIG. 10A is a flowchart illustrating the operation of an electronic device for mapping a second tele image to recognition information of a first wide image, according to an embodiment.

FIG. 10A is a flowchart illustrating the operation of an electronic device for mapping a second tele image to recognition information of a first wide image, according to an embodiment. The operation of the electronic device for mapping the second tele image to the recognition information of the first wide image may correspond to step 703 illustrated in FIG. 7.

Figure 10B:
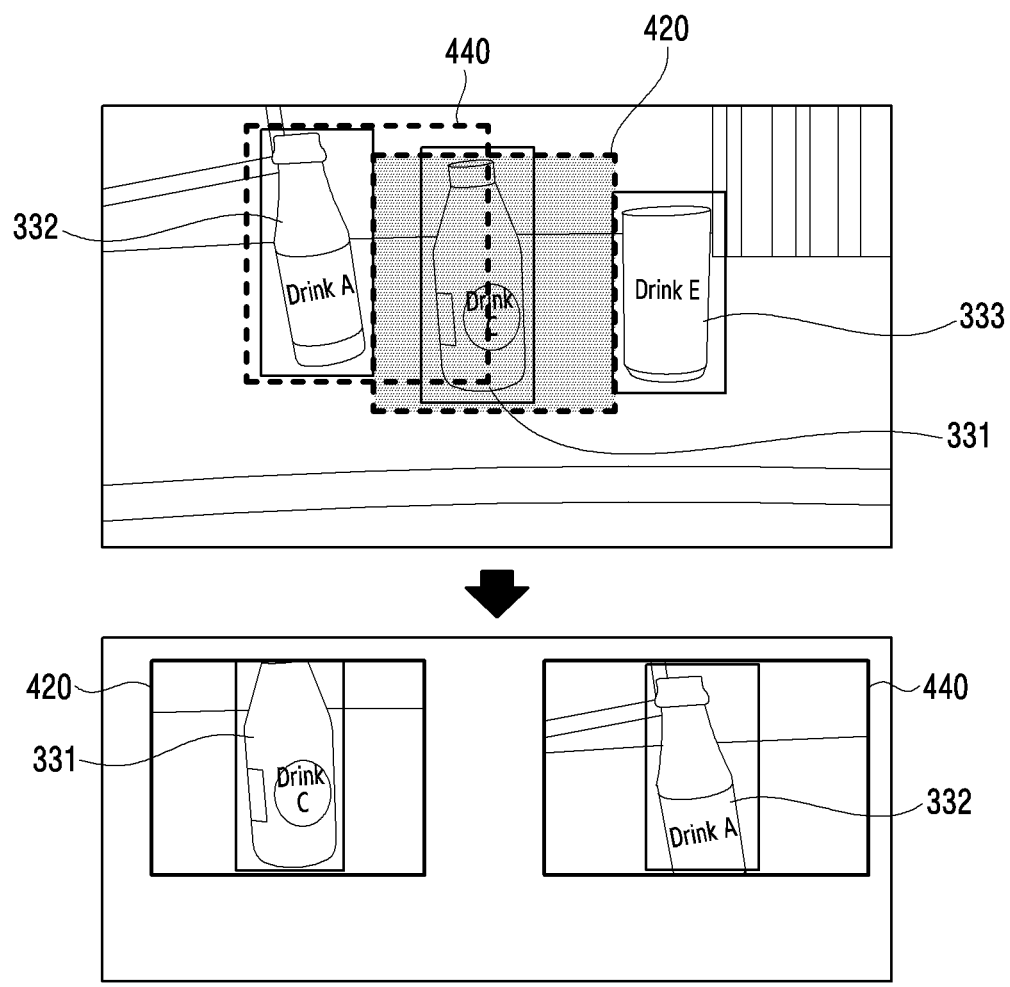
FIG. 10B illustrates an example of mapping between a second tele image and a first wide image, according to an embodiment.

Referring to FIG. 10A, in step 1001, the processor 120 of the electronic device 101 extracts a key point of an object from recognition information of the first wide image 410 of FIG. 10B. The electronic device 101 may extract areas of interest on the basis of the first wide image 410 and extract key points on the basis of a plurality of corner points included in the area corresponding to the second object 332 in the extracted areas of interest of FIG. 10B.

In step 1003, the electronic device 101 generates object coordinates on the basis of the extracted key points. The electronic device 101 may generate coordinate information of the second object included in the first wide image 410 on the basis of the key points generated through the plurality of corner points. For example, the coordinate information may include a coordinate value on the first wide image 410 of FIG. 10B based on first zoom information corresponding to the first camera 310. Since a coordinate value on the second tele image 440 of FIG. 10B including the same object is based on different second zoom information, the coordinate value may vary.

In step 1005, the electronic device 101 matches the generated object coordinates with key points of the first wide image 410 corresponding to the configured location information of the object of the second tele image 440 of FIG. 10B. When the first zoom information and the second zoom information have different values, the electronic device 101 may acquire a ratio between the first zoom information and the second zoom information and adjust the size of the object included in the second tele image 440 through calculations based on the acquired ratio.

In step 1007, the electronic device 101 determines whether the number of key points is greater than or equal to a preset number. Among the key points acquired from the second tele image 440 of FIG. 10B, the electronic device 101 may acquire the number of key points that matches the key points acquired from the first wide image 410 of FIG. 10B. The electronic device 101 may determine whether the number of matching key points is greater than or equal to the preset number. It may be determined whether the object included in the first wide image 410 of FIG. 10B is the same as the object included in the second tele image 440 of FIG. 10B on the basis of the determination. For example, when the number of matching key points is less than the preset number, the object of the first wide image 410 and the object of the second tele image 440 are different from each other, so that the number of matching key points may be small. Accordingly, the electronic device 101 may determine that the object of the first wide image 410 and the object of the second tele image 440 are different from each other and, in order to acquire recognition information of the object included in the second tele image 440, transmit the second wide image 430 to the server 108.

In step 1009, the electronic device 101 determines that the object of the first wide image 410 of FIG. 10B is the same as the object of the second tele image 440 of FIG. 10B. When the number of matching key points is greater than or equal to the preset number (Yes in step 1007), the object of the first wide image 410 and the object of the second tele image 440 are the same as each other, so that the number of matching key points may be larger than the preset number. Accordingly, the electronic device 101 may determine that the object of the first wide image 410 is the same as the object of the second tele image 440. Thereafter, in order to recognize the object of the second tele image 440, the electronic device 101 may not transmit the second wide image 430 to the server 108. For example, the electronic device 101 may acquire recognition information by transmitting only an object image corresponding to the second object 332 included in the second tele image 440 and type information of the second object 332 of the first wide image 410 to the server 108.

Figure 11A:
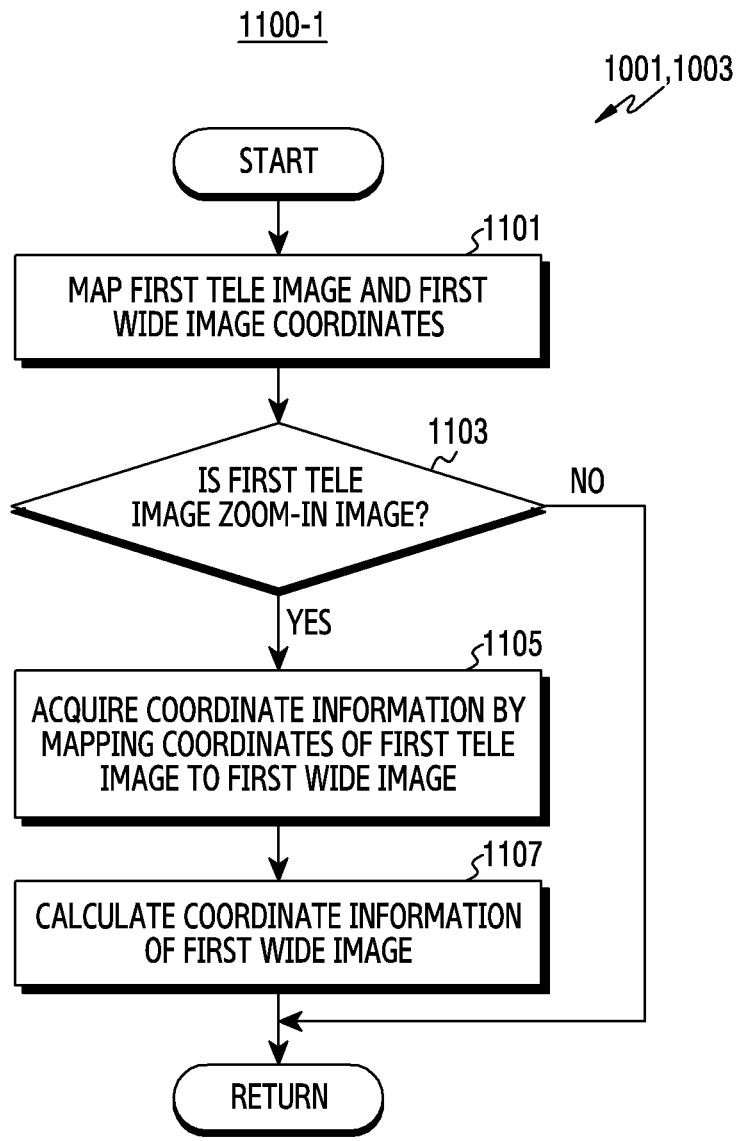
FIG. 11A is a flowchart illustrating the operation for determining whether a second tele image is included in recognition information of a first wide image by an electronic device, according to an embodiment.

FIG. 11A is a flowchart illustrating the operation for determining whether a second tele image is included in recognition information of a first wide image by an electronic device, according to an embodiment. The steps illustrated in FIG. 11A may correspond to steps 1001 to 1003 illustrated in FIG. 10A.

Figure 11B:
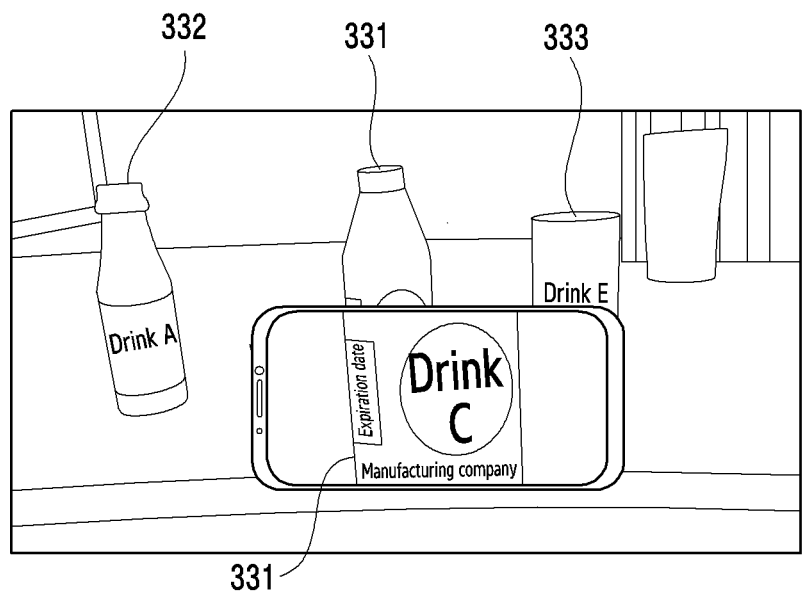
FIG. 11B illustrates an example of a second tele image acquired by a second camera of an electronic device, according to an embodiment.

Referring to FIG. 11A, in step 1101, the processor 120 of the electronic device 101 maps coordinates of the first wide image 410 and the first tele image 420. The electronic device 101 may determine the size of the first wide image 410 and the first tele image 420 on the basis of first zoom information corresponding to the first camera 310 pertaining to a wide FOV and second zoom information corresponding to the second camera 320 pertaining to a narrow FOV. For example, the electronic device 101 may determine that the area of the first wide image 410 is 100 when the first zoom information of a preview image being displayed on an electronic device shown in FIG. 11B corresponds to magnification of 1× and determine that the area of the first tele image 420 is 25 when the second zoom information of the preview image being displayed on the electronic device shown in FIG. 11B corresponds to magnification of 4×. The electronic device 101 may compare objects displayed within respective images and map coordinates of an area corresponding to the first wide image 410 and an area corresponding to the first tele image 420.

In step 1103, the electronic device 101 determines whether the first tele image 420 corresponds to a zoom in state. The electronic device 101 may determine that the first tele image 420 corresponds to the zoom in state on the basis of the first zoom information corresponding to the second camera 320. When the first tele image 420 does not correspond to the zoom in state, the electronic device 101 may end the process since there is no need to map coordinates in consideration of a magnification difference based on the first zoom information and the second zoom information.

In step 1105, the electronic device 101 acquires coordinate information of the first tele image 420 within the first wide image 410 by mapping the first tele image 420 to the first wide image 410. When it is determined that the first wide image 410 corresponds to the zoom in state, the electronic device 101 may map coordinates of the first tele image 420 to the first wide image 410. Since the first wide image 410 acquired by the first camera 310 corresponding to the wide FOV corresponds to the zoom in state, the electronic device 101 may calculate coordinate information based on the magnification of the first wide image 410.

In step 1107, the electronic device 101 calculates coordinate information of the first tele image 420. The electronic device 101 may calculate coordinate information of an area in which an object is displayed in the first tele image 420 on the basis of the acquired coordinate information. The electronic device 101 may extract only some areas of the first tele image 420 on the basis of the calculated coordinate information and transmit the extracted areas to the server 108 so as to receive recognition information of the object.

The electronic device 101 may include a memory for storing instructions, the first camera 310 corresponding to a first FOV, the second camera 320 corresponding to a second FOV narrower than the first FOV, the sensor module 176, and the processor 120. The processor 120 may acquire a first image (for example, the first wide image 410) related to a first area corresponding to the first FOV through the first camera 310, the first image including a first object 331 and a second object 332, acquire a second image (for example, the first tele image 420) related to a second area corresponding to a second FOV and included in the first area through the second camera 320, the second image (for example, the first tele image 420) including the second object 332, acquire first information on a relative location between the first area and the second area on the basis of the first image (for example, the first wide image 410) and the second image (for example, the first tele image 420), acquire a third image (for example, the second tele image 440) corresponding to a third area changed from the second area according to motion of the electronic device, identify the second object 332 included in the third image (for example, the second tele image 440) on the basis of second information on motion of the electronic device and the first information, acquire information on the second object 332 on the basis of information on the second object 332 recognized through acquisition of the first image (for example, the first wide image 410), and store the information on the second object 332 in the memory.

The processor may acquire the first image (for example, the first wide image 410) and transmit information on the acquired first image (for example, the first wide image 410) to a server.

The third image (for example, the second tele image 440) may be determined on the basis of at least one piece of the first information, the second information, first zoom information corresponding to the first camera 310, and second zoom information corresponding to the second camera 320.

The processor 120 may extract an object image corresponding to an area of the second object 332, generate recognition information of the second object 332 on the basis of a type of the second object 332, and transmit the generated recognition information and the extracted object image.

The processor 120 may determine a first period related to generation of recognition information of the first image (for example, the first wide image 410) on the basis of the second information and determine a second period related to mapping of the a fourth image (for example, the second wide image 430) to the first image (for example, the first wide image 410).

The electronic device may further include an image recognition engine for generating first recognition information on the basis of the first image (for example, the first wide image 410) and generating second recognition information on the basis of the third image (for example, the second tele image 440).

The sensor module 176 may include a gyro sensor (not shown) and a gravity sensor. The processor 120 may acquire information related to rotation in the second information through the gyro sensor and acquire information related to vertical movement and horizontal movement in the second information through the gravity sensor.

When the second image (for example, the first tele image 420) leaves a range of the first image (for example, the first wide image 410), the processor may receive the third image (for example, the second tele image 440) from the second camera 310 and generate recognition information of an area except for the first image area from the third image.

The first recognition information may include information related to types of the first object 331 and the second object 332, and the second recognition information may include a product name of the second object 332, a place in which the second object 332 is sold, and price comparison information.

The mapping may be determined on the basis of first zoom information corresponding to the first camera 310 and second zoom information corresponding to the second camera 320.

The processor 120 may also store object recognition accuracy and directly display object information on the basis of accuracy.

The processor 120 may recognize the object again through the second camera 320 on the basis of the object recognition accuracy.

When a range of the motion exceeds a predetermined range on the basis of the second information, the processor 120 may generate the third image (for example, the second wide image 430) through the first camera 310.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a CD-ROM, digital versatile discs (DVDs), or other type optical storage devices, or a magnetic cassette. Alternatively, any combination of some or all of the aforementioned memories may form a memory in which the program is stored. Further, a plurality of such memories may be included in the electronic device.

In addition, the programs may be stored in an attachable storage device which is accessible through communication networks such as the Internet, Intranet, LAN, WAN, and storage area network (SAN), or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural. However, the singular form or plural form is selected for convenience of description suitable for the situation presented, and various embodiments of the present disclosure are not limited to a single element or multiple elements thereof. Further, either multiple elements expressed in the description may be configured into a single element or a single element in the description may be configured into multiple elements.

According to the present disclosure, an electronic device and a method of operating the same can reduce a period on which an object recognition engine is called and thus reduce a load of the electronic device by performing object recognition using recognition information of an image acquired from a wide angle camera.

In addition, an electronic device and a method of operating the same, according to the present disclosure, can reduce consumption of data exchanged with a server and reduce recognition delay according to data transmission by performing object recognition using recognition information of an image acquired from a wide angle camera.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device comprising:
   a housing comprising a first external surface;
   a first imaging device exposed through a first portion of the first external surface and comprising a first field of view (FOV);
   a second imaging device exposed through a second portion of the first external surface adjacent to the first portion and comprising a second FOV narrower than the first FOV;
   a communication circuit;
   at least one processor operatively connected to the first imaging device, the second imaging device, and the communication circuit; and
   a memory operatively connected to the processor and configured to store instructions executed through the processor that cause the processor to:
   generate a first image including a first object and a second object from a first time point through the first imaging device,
   generate a second image including the first object simultaneously with the generation of the first image from the first time point through the second imaging device,
   transmit the first image and the second image to an external server through the communication circuit,
   receive object recognition information of the first object and the second object,
   detect motion of the electronic device,
   generate a third image including the second object from a second time point different from the first time point through the second imaging device,
   extract a partial area corresponding to the second object from the third image, based at least partially on the object recognition information or the detected motion, the partial area corresponding to the second object being smaller than the third image, and
   transmit the partial area corresponding to the second object and the object recognition information to the external server through the communication circuit.

2. The electronic device of claim 1, wherein the instructions, when executed, further cause the processor to receive recognition information of the second object from the external server through the communication circuit.

3. The electronic device of claim 1, wherein the instructions, when executed, when the third image is not in the object recognition information of the first image, based on movement information of the first time point and the second time point, further cause the processor to generate a fourth image including the second object from the second time point through the first imaging device.

4. The electronic device of claim 3, wherein the instructions, when executed, further cause the processor to determine a first period related to generation of recognition information of the third image, based on information on motion of the electronic device and determine a second period related to mapping of the third image to the first image.

5. The electronic device of claim 1, further comprising an image recognition engine configured to generate first recognition information based on the first image and second recognition information based on the second image.

6. The electronic device of claim 1, wherein the instructions, when executed, further cause the processor to store object recognition accuracy and directly display object information, based on the accuracy.

7. The electronic device of claim 6, wherein the instructions, when executed, further cause the processor to recognize again the object through the second imaging device, based on the object recognition accuracy.

8. The electronic device of claim 7, wherein the instructions, when executed, when the third image leaves a range of the first image, further cause the processor to receive third image information from the second camera and generate recognition information of an area except for a first image area in the third image.

9. The electronic device of claim 1, wherein the instructions, when executed, when a range of the motion exceeds a predetermined range, based on the second information, further cause the processor to generate a fourth image through the first camera.

10. The electronic device of claim 5, wherein the first recognition information includes information related to types of the first object and the second object, and the second recognition information includes information on a product name of the second object, a place to sell a product, and price comparison.

11. A method of operating an electronic device, the method comprising:
   generating a first image including a first object and a second object through a first imaging device at a first time point;
   generating a second image including the first object simultaneously with the generation of the first image through a second imaging device at the first time point;
   transmitting the first image and the second image to an external server;
   receiving object recognition information of the first object and the second object from the external server;
   detecting motion of the electronic device;

generating a third image including the second object through the second imaging device at a second time point different from the first time point;

extracting a partial area corresponding to the second object from the third image, based at least partially on the object recognition information or the detected motion, the partial area corresponding to the second object being smaller than the third image; and transmitting the partial area corresponding to the second object and the object recognition information to the external server, wherein the first imaging device includes a first field of view (FOV) and the second imaging device includes a second FOV narrower than the first FOV.

12. The method of claim 11, further comprising receiving recognition information of the second object from the external server.

13. The method of claim 11, further comprising, when the third image is not in the object recognition information of the first image, based on movement information of the first time point and the second time point, generating a fourth image including the second object from the second time point through the first imaging device.

14. The method of claim 11, further comprising:
determining a first period related to generation of recognition information of the third image, based on information on motion of the electronic device; and
determining a second period related to mapping of the third image to the first image.

15. The method of claim 11, further comprising:
generating first recognition information based on the first image; and
generating second recognition information based on the second image.

16. The method of claim 11, further comprising:
storing object recognition accuracy; and
directly displaying object information, based on the object recognition accuracy.

17. The method of claim 16, further comprising recognizing again the object through the second imaging device, based on the object recognition accuracy.

18. The method of claim 17, further comprising:
when the second image leaves a range of the first image, receiving third image information from the second camera; and
generating recognition information of an area except for a first image area in the third image.

19. The method of claim 11, further comprising, when a range of the motion exceeds a predetermined range, based on the second information, generating a fourth image through the first camera.

20. The method of claim 15, wherein the first recognition information includes information related to types of the first object and the second object, and the second recognition information includes information on a product name of the second object, a place to sell a product, and price comparison.

* * * * *